(12) United States Patent
Sasabuchi et al.

(10) Patent No.: US 9,321,460 B2
(45) Date of Patent: Apr. 26, 2016

(54) RAILROAD CROSSING BARRIER ESTIMATING APPARATUS AND VEHICLE

(71) Applicant: HONDA MOTOR CO., LTD., Minato-Ku, Tokyo (JP)

(72) Inventors: Yoji Sasabuchi, Tochigi-Ken (JP); Hiroyuki Koike, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 258 days.

(21) Appl. No.: 13/793,286

(22) Filed: Mar. 11, 2013

(65) Prior Publication Data
US 2013/0261950 A1    Oct. 3, 2013

(30) Foreign Application Priority Data

Mar. 28, 2012   (JP) .................. 2012-074172
Jul. 25, 2012   (JP) .................. 2012-164835

(51) Int. Cl.
| | | |
|---|---|---|
| G06F 17/10 | (2006.01) | |
| G06G 7/78 | (2006.01) | |
| G08G 1/16 | (2006.01) | |

(Continued)

(52) U.S. Cl.
CPC .............. *B60W 30/09* (2013.01); *B61L 23/041* (2013.01); *B61L 29/246* (2013.01); *B61L 29/30* (2013.01); *G01S 11/12* (2013.01); *G01S 13/931* (2013.01); *G01S 17/936* (2013.01); *G06K 9/00805* (2013.01); *G08G 1/165* (2013.01); *B60W 2550/10* (2013.01); *G01S 2013/936* (2013.01); *G01S 2013/9342* (2013.01); *G01S 2013/9346* (2013.01); *G01S 2013/9353* (2013.01);

(Continued)

(58) Field of Classification Search
CPC .................. B60R 2021/0004; B60R 2021/009; B60R 2021/0025; B60R 2021/0134; G01S 13/931; G01S 13/9328; G01S 13/9375; G01S 13/50; G01S 13/58
See application file for complete search history.

(56) References Cited

U.S. PATENT DOCUMENTS 5,173,692 A * 12/1992 Shapiro .................. G01S 7/539
                                                                340/917
6,151,539 A * 11/2000 Bergholz et al. ................. 701/25
(Continued)

FOREIGN PATENT DOCUMENTS

| CN | 101475002 A | 7/2009 |
|---|---|---|
| CN | 101797911 A | 8/2010 |

(Continued)

OTHER PUBLICATIONS

Office Action dated Mar. 11, 2014 issued over the corresponding Japanese Patent Application 2012-164835 with the English translation of pertinent portion.

(Continued)

*Primary Examiner* — Jerrah Edwards
*Assistant Examiner* — Tommy Worden
(74) *Attorney, Agent, or Firm* — Carrier Blackman & Associates, P.C.; Joseph P. Carrier; Jeffrey T. Gedeon

(57) ABSTRACT

A railroad crossing barrier estimating apparatus and a vehicle that incorporates therein such a railroad crossing barrier estimating apparatus are provided. When at least one of an external object the transverse width of which increases over time and an external object having a given length at a certain height from the ground is detected, the vehicle or the railroad crossing barrier estimating apparatus estimates the detected external object as a railroad crossing barrier.

4 Claims, 12 Drawing Sheets

(51) Int. Cl.
*B60W 30/09* (2012.01)
*B61L 29/24* (2006.01)
*B61L 29/30* (2006.01)
*G01S 17/93* (2006.01)
*G01S 11/12* (2006.01)
*G01S 13/93* (2006.01)
*B61L 23/04* (2006.01)
*G06K 9/00* (2006.01)

(52) U.S. Cl.
CPC . *G01S2013/9375* (2013.01); *G01S 2013/9378* (2013.01); *G08G 1/164* (2013.01)

(56) References Cited

U.S. PATENT DOCUMENTS

| | | | |
|---|---|---|---|
| 6,345,233 | B1 | 2/2002 | Erick |
| 7,876,258 | B2 * | 1/2011 | Abraham et al. ............... 342/29 |
| 8,538,674 | B2 * | 9/2013 | Breuer ............... B60T 8/17558 340/436 |
| 2002/0003571 | A1 * | 1/2002 | Schofield et al. ............ 348/148 |
| 2002/0170685 | A1 * | 11/2002 | Weik et al. ................... 160/133 |
| 2002/0183906 | A1 | 12/2002 | Ikeda |
| 2004/0066376 | A1 * | 4/2004 | Donath et al. ................ 345/169 |
| 2005/0128063 | A1 * | 6/2005 | Isaji et al. .................... 340/439 |
| 2007/0219681 | A1 * | 9/2007 | Kumar et al. .................. 701/19 |
| 2009/0194642 | A1 * | 8/2009 | Honeck .................. B61L 29/08 246/114 R |
| 2011/0190972 | A1 * | 8/2011 | Timmons ............... G01C 21/34 701/31.4 |
| 2012/0083960 | A1 * | 4/2012 | Zhu et al. ........................ 701/23 |
| 2013/0261950 | A1 * | 10/2013 | Sasabuchi et al. ............ 701/301 |

FOREIGN PATENT DOCUMENTS

| | | |
|---|---|---|
| JP | 07-114699 A | 5/1995 |
| JP | 11-044533 A | 2/1999 |
| JP | 2003-312461 A | 11/2003 |
| JP | 2008-040821 A | 2/2008 |
| JP | 2008-186265 A | 8/2008 |
| WO | 2010/135784 A1 | 12/2010 |

OTHER PUBLICATIONS

Office Action and Search Report dated Feb. 28, 2015 issued over the corresponding Chinese Patent Application No. 201310102440.3 with English translation of pertinent portion.

* cited by examiner

RAILROAD CROSSING BARRIER ESTIMATING APPARATUS AND VEHICLE

CROSS-REFERENCE TO RELATED APPLICATIONS

This application is based upon and claims the benefit of priority from Japanese Patent Applications No. 2012-074172 filed on Mar. 28, 2012 and No. 2012-164835 filed on Jul. 25, 2012, the contents all of which are incorporated herein by reference.

BACKGROUND OF THE INVENTION

1. Field of the Invention

The present invention relates to a railroad crossing barrier estimating apparatus for estimating the presence of a railroad crossing barrier as well as to a vehicle that incorporates therein such a railroad crossing barrier estimating apparatus.

2. Description of the Related Art

Japanese Laid-Open Patent Publication No. 11-044533 (hereinafter referred to as "JP11-044533A") discloses an apparatus for measuring the distance from a host vehicle to an object, i.e., a preceding vehicle that is traveling in the same direction as the host vehicle, using a laser radar 2 (see step 101 in FIG. 4, paragraph [0020]). When the disclosed apparatus appropriately measures the distance to the preceding vehicle (step 103: YES, paragraph [0020]), the apparatus calculates an intervehicular distance to the preceding vehicle from the distance measured by the laser radar 2 as well as the angle at which the laser radar 2 is mounted on the host vehicle (step 107, paragraph [0023]). The apparatus thereby controls the vehicle speed in order to make the intervehicular distance equal to or greater than a predetermined value (step 114, paragraph [0027]).

SUMMARY OF THE INVENTION

According to JP11-044533A, as described above, if the intervehicular distance can be detected with the laser radar 2 (step 103: YES), then the apparatus calculates the intervehicular distance based on output data from the laser radar 2 (step 107). If ahead in the road there is a railroad crossing barrier bar, i.e., a bar that blocks the road, the apparatus according to JP11-044533A may possibly limit the vehicle speed of the host vehicle due to the presence of the railroad crossing barrier bar. If the vehicle speed is limited in this manner, then the driver may feel strange or awkward. In other words, JP11-044533A does not take into account any information in relation to estimating the presence of a railroad crossing barrier with a sensor such as the laser radar 2 or the like.

It is an object of the present invention to provide a railroad crossing barrier estimating apparatus, which is capable of easily estimating the presence of a railroad crossing barrier, as well as to a vehicle that incorporates therein such a railroad crossing barrier estimating apparatus.

According to the present invention, a vehicle comprises an avoidance controller for performing an avoidance control process for avoiding a collision between the vehicle and an external object, if the external object is present in a route of the vehicle, or if the external object is about to enter the route. The avoidance controller comprises an external object position judger for judging a three-dimensional position of the external object with respect to a position of the vehicle, and a railroad crossing barrier estimator for estimating the presence of a railroad crossing barrier. If the external object is estimated as the railroad crossing barrier, the avoidance controller cancels the avoidance control process with respect to the railroad crossing barrier, and if at least one of an external object the transverse width of which increases over time and an external object having a given length at a certain height from the ground is detected, the railroad crossing barrier estimator estimates the detected external object as the railroad crossing barrier.

Since the driver of the vehicle usually drives the vehicle while being aware of the presence of a railroad crossing barrier, the avoidance control process, which is carried out in relation to the railroad crossing barrier, tends to make the driver feel strange or awkward. According to the present invention, the vehicle cancels the avoidance control process (outputting of a warning, applying an automatic brake, etc.) in relation to the railroad crossing barrier, if the railroad crossing barrier is present in the route of the vehicle, or if the railroad crossing barrier is about to enter the route of the vehicle. Therefore, the driver is prevented from feeling strange or awkward.

According to the present invention, furthermore, if at least one of an external object the transverse width of which increases over time and an external object having a given length at a certain height from the ground is detected, the railroad crossing barrier estimator estimates the detected external object as the railroad crossing barrier. Therefore, even if the judgment accuracy or the performance of the external object position judger is relatively low, it is still possible to estimate the external object as the railroad crossing barrier.

The vehicle may be detected as being positioned in or before a railroad crossing based on a behavior exhibited by the vehicle when the vehicle moves through the railroad crossing, or based on map information. The avoidance control process is changed if the vehicle is positioned in or before the railroad crossing, and a barrier bar of the railroad crossing barrier is being lowered. With such an arrangement, the vehicle is detected as being positioned in or before the railroad crossing based on the behavior exhibited by the vehicle, or based on map information when the vehicle moves through the railroad crossing. Consequently, the accuracy at which a judgment is made concerning the railroad crossing barrier is increased. In addition, even if the barrier bar is currently being lowered, it is possible to estimate the presence of the railroad crossing barrier.

According to the present invention, there also is provided a railroad crossing barrier estimating apparatus, which is adapted to be installed on a mobile body, for detecting external objects using a radar for scanning at least two layers having different heights from the ground, or using an image capturing device for capturing an image of an area including the at least two layers, and estimating a railroad crossing barrier from among the external objects. If at least one of an external object the transverse width of which increases over time and an external object having a given length at a certain height from the ground is detected, the detected external object is estimated as the railroad crossing barrier.

With the above arrangement, the detected external object is estimated as the railroad crossing barrier if at least one of an external object the transverse width of which increases over time and an external object having a given length at a certain height from the ground is detected. Consequently, even if the judgment accuracy of the radar or the image capturing performance (resolution, number of pixels, image capturing range, etc.) of the image capturing device is relatively low, it is still possible to estimate the external object as the railroad crossing barrier.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A. First Embodiment

1. Configuration (1-1. Overall Configuration)

Figure 1:
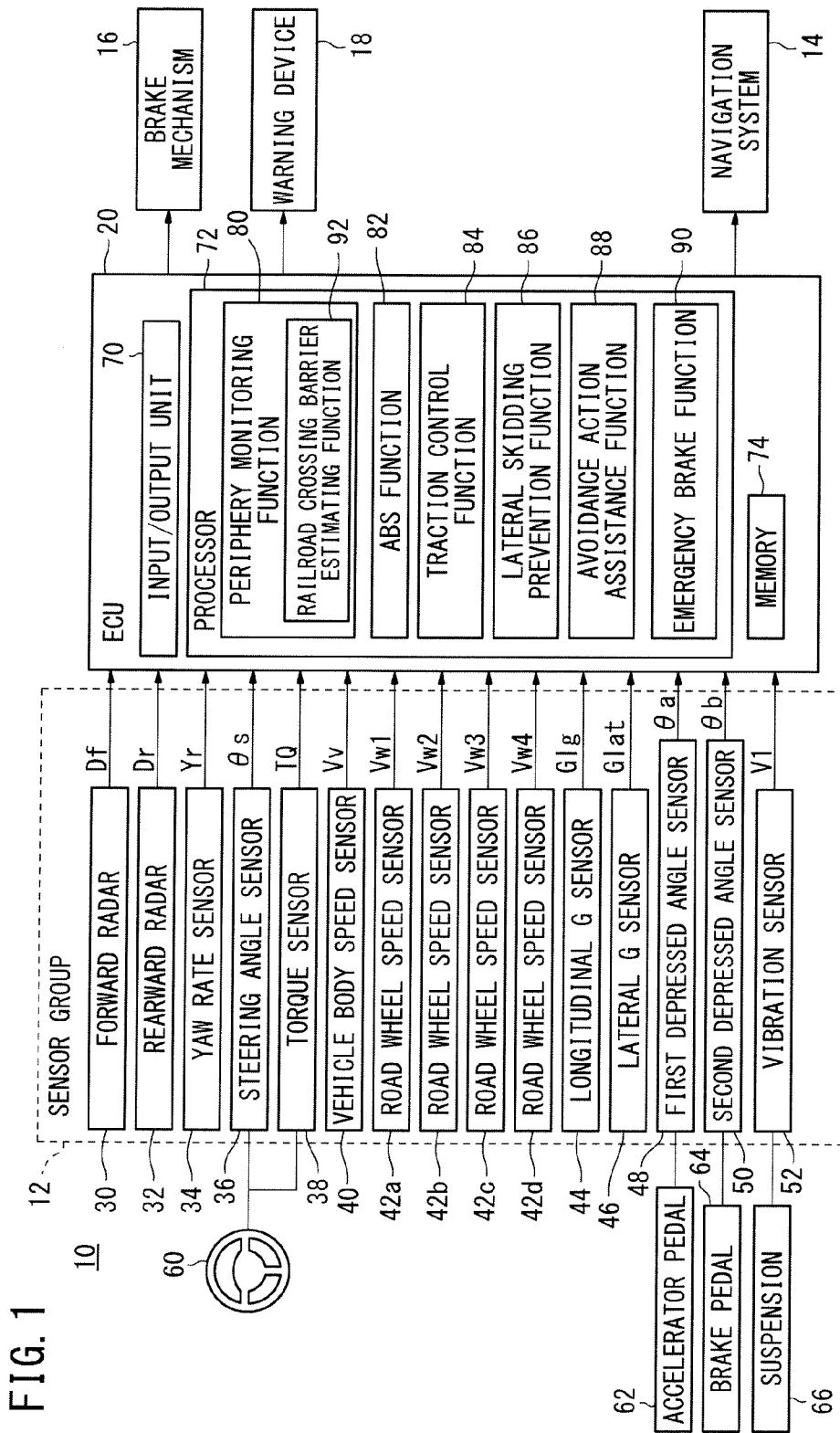
FIG. 1 is a block diagram of a vehicle according to a first embodiment of the present invention.

FIG. 1 shows in block form a vehicle (mobile body) 10 (hereinafter also referred to as a "host vehicle 10") according to a first embodiment of the present invention.

As shown in FIG. 1, the vehicle 10 includes a sensor group 12 for detecting various data, a navigation system 14, a brake mechanism 16, a warning device 18, and an electronic control unit (railroad crossing barrier estimating apparatus) 20 (hereinafter referred to as an "ECU 20").

(1-2. Sensor Group 12)

As shown in FIG. 1, the sensor group 12 includes a forward radar (external object position judger, radar) 30, a rearward radar 32, a yaw rate sensor 34, a steering angle sensor 36, a torque sensor 38, a vehicle body speed sensor (vehicle speed sensor) 40, road wheel speed sensors 42a, 42b, 42c, 42d, a longitudinal G sensor 44, a lateral G sensor 46, a first depressed angle sensor 48, a second depressed angle sensor 50, and a vibration sensor 52.

The forward radar 30 comprises a laser radar, which is mounted on a front grille or the like (not shown) of the vehicle 10. The forward radar 30 emits electromagnetic waves such as millimeter waves or the like, which are emitted as transmission waves in a forward direction of the vehicle 10. The forward radar 30 detects the distance (forward relative distance Df) [m] to a front obstacle or an external object, e.g., a preceding car, a bearing of the front obstacle or the external object with respect to the host vehicle 10, and the size of the front obstacle or the external object, based on reflection of the transmission waves, and the forward radar 30 sends signals representing the detected data to the ECU 20.

Figure 2:
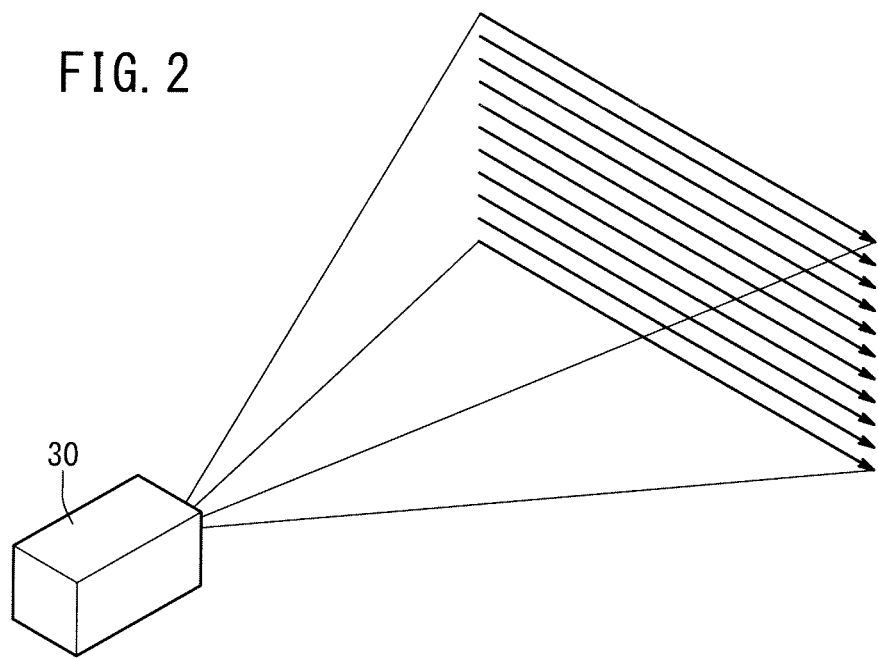
FIG. 2 is a perspective view showing the manner in which a forward radar sweeps transmission waves.

FIG. 2 shows in perspective the manner in which the forward radar 30 sweeps transmission waves. As shown in FIG. 2, the forward radar 30 two-dimensionally scans a forward area in front of the vehicle 10 with swept transmission waves in order to obtain three-dimensional positional information of the forward area. The transmission waves may be swept in any of various other patterns apart from the pattern shown in FIG. 2.

The rearward radar 32 comprises a laser radar, which is mounted on a rear grille or the like (not shown) of the vehicle 10. The rearward radar 32 emits electromagnetic waves such as millimeter waves or the like, which are emitted as transmission waves rearwardly of the vehicle 10.

The rearward radar 32 detects the distance (rearward relative distance Dr) [m] to a rear obstacle or an external object, e.g., a rear car, a bearing of the rear obstacle or the external object with respect to the host vehicle 10, and the size of the rear obstacle or the external object, based on reflection of the transmission waves, and the rearward radar 32 sends signals representing the detected data to the ECU 20. The rearward radar 32 may have specifications that are identical to or different from the specifications of the forward radar 30.

The yaw rate sensor 34 detects a yaw rate Yr [°/sec] of the vehicle 10. The steering angle sensor 36 detects a steering angle θs of a steering wheel 60. The torque sensor 38 detects a torque TQ applied to the steering wheel 60.

The vehicle body speed sensor 40 includes first Hall devices (not shown) for detecting rotation of the countershaft of the transmission mounted in the vehicle 10, and a first processor (not shown) for calculating a vehicle body speed Vv [km/h] of the vehicle 10 based on signals output from the first Hall devices. The first processor may be included in the ECU 20.

The road wheel speed sensors 42a, 42b, 42c, 42d include second Hall devices (not shown) for detecting rotation of the road wheels of the vehicle 10, and second processors (not shown) for calculating road wheel speeds Vw1, Vw2, Vw3, Vw4 (hereinafter collectively referred to as "road wheel speeds Vw") [km/h] of the vehicle 10 based on signals output from the second Hall devices. The second processor may be included in the ECU 20.

The longitudinal G sensor 44, which comprises an acceleration sensor, detects a longitudinal acceleration Glg of the vehicle 10. The lateral G sensor 46, which comprises an acceleration sensor, detects a lateral acceleration Glat of the vehicle 10. The first depressed angle sensor 48 detects a depressed angle θa of an accelerator pedal 62 of the vehicle 10. The second depressed angle sensor 50 detects a depressed angle θb of a brake pedal 64 of the vehicle 10.

The vibration sensor 52 detects a triaxial vibrational quantity V1 of a suspension 66 of the vehicle 10, and sends the detected triaxial vibrational quantity V1 to the ECU 20. The triaxial vibrational quantity V1 is representative of vibrational amplitudes in longitudinal, widthwise, and heightwise directions of the vehicle 10. From the standpoint of determining whether or not the vehicle 10 is positioned in a railroad crossing 100 (see FIG. 3), as described later, the vibration sensor 52 may detect a vibrational quantity V1 only in a heightwise direction of the vehicle 10.

(1-3. Navigation System 14)

The navigation system 14 detects a present position of the vehicle 10 using a GPS (Global Positioning System), and provides route guidance for a destination to the user (driver) of the vehicle 10. The navigation system 14 includes a non-illustrated memory that stores a map information database therein.

(1-4. Brake Mechanism 16)

The brake mechanism 16 includes a master cylinder, wheel cylinders, etc., not shown, for generating braking forces that are applied to the road wheels.

(1-5. Warning Device 18)

The warning device 18 includes a speaker, not shown. A warning sound is output from the speaker to the driver in response to a command from the ECU 20.

(1-6. ECU 20)

As shown in FIG. 1, the ECU 20 includes hardware devices, including an input/output unit 70, a processor 72, and a memory 74. According to the first embodiment, the processor 72 controls the brake mechanism 16 and the warning device 18 in order to perform various functions based on programs stored in the memory 74.

As shown in FIG. 1, the various functions include a periphery monitoring function 80, an antilock brake system function 82 (hereinafter referred to as an "ABS function 82"), a traction control function 84, a lateral skidding prevention function 86, an avoidance action assistance function (part of an avoidance controller) 88, and an emergency brake function (part of the avoidance controller) 90.

The periphery monitoring function 80 is a function to monitor the periphery of the vehicle 10 based on output signals from the forward radar 30 and the rearward radar 32. The periphery monitoring function 80 also includes a railroad crossing barrier estimating function (railroad crossing barrier estimator) 92. The railroad crossing barrier estimating function 92 estimates the presence of railroad crossing barriers 110*a*, 110*b*, 110*c*, 100*d* (see FIG. 3).

The ABS function 82 is a function to prevent the road wheels from becoming locked when the brake mechanism 16 applies braking forces to the road wheels in order to brake the vehicle 10. The traction control function 84 is a function to control a brake fluid pressure in a wheel cylinder (not shown) combined with at least one of the road wheels, which is a drive road wheel that tends to slip excessively when the vehicle 10 is not braked. For example, the traction control function 84 may be used to prevent the road wheels from skidding laterally when the vehicle 10 turns along a curved road.

The avoidance action assistance function 88 assists the driver in turning the steering wheel 60 in order to enable the host vehicle 10 to avoid an obstacle (external object). The avoidance action assistance function 88 includes a function to control an auxiliary motor to assist the driver in turning the steering wheel 60 in a direction so that the host vehicle 10 avoids the obstacle, and a function to control the auxiliary motor to apply a resistive force (reaction force) against an effort that the driver may make to turn the steering wheel 60 in a direction that the driver should not turn the steering wheel 60.

The emergency brake function 90 includes a brake assisting function to increase the brake fluid pressure generated when the driver depresses the brake pedal 64, and an automatic brake function to automatically (i.e., without the driver depressing the brake pedal 64) increase the brake fluid pressure in each of the wheel cylinders associated with the respective road wheels, depending on the forward relative distance Df to a forward obstacle (external object). The emergency brake function 90 controls the warning device 18 to produce a warning sound when the automatic brake function is implemented, for example.

The memory 74 comprises a RAM (Random Access Memory) for storing digital image signals and temporary data that are used in various processing sequences, and a ROM (Read Only Memory) for storing executable programs as well as tables or maps.

2. Railroad-Crossing-Barrier-Related Control Process

A railroad-crossing-barrier-related control process according to the first embodiment will be described below.

(2-1. Premise)

Figure 3:
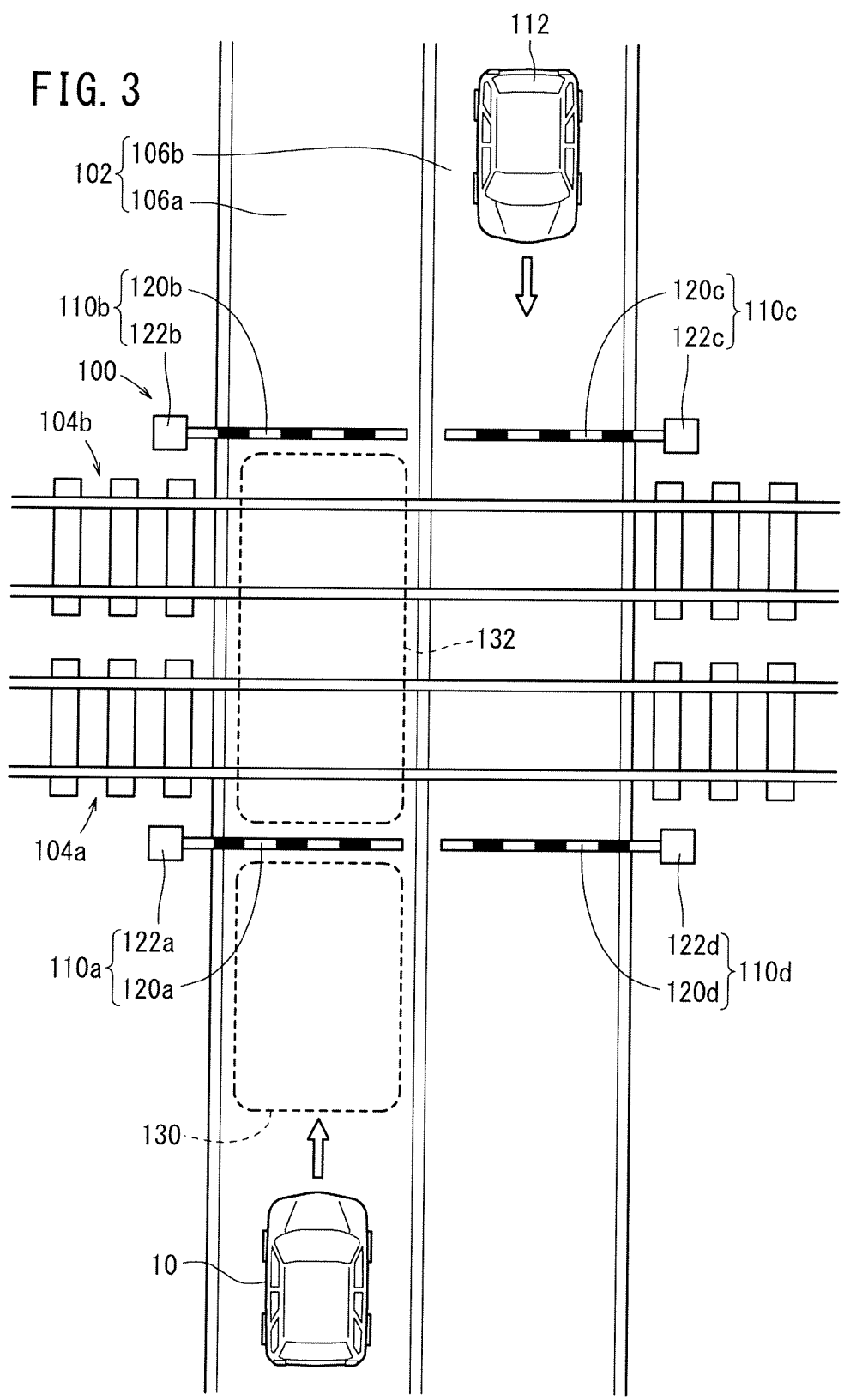
FIG. 3 is a plan view of a railroad crossing and areas in the vicinity thereof.

FIG. 3 is a plan view of a railroad crossing 100 and nearby areas. The railroad crossing 100 is a place where a vehicle road 102, with one lane each way, and two rail tracks 104*a*, 104*b* (hereinafter referred to as "tracks 104*a*, 104*b*", also collectively referred to as "rail tracks 104" or "tracks 104") intersect each other.

According to the first embodiment, the vehicle 10 keeps to the left while driving on the vehicle road 102. The vehicle road 102 has two lanes 106*a*, 106*b*. The vehicle 10 travels on the left lane 106*a* (route of the vehicle 10) as seen from the driver of the vehicle 10, whereas the right lane 106*b* is an oncoming lane.

The railroad crossing 100 has a first railroad crossing barrier 110*a*, a second railroad crossing barrier 110*b*, a third railroad crossing barrier 110*c*, and a fourth railroad crossing barrier 110*d* (hereinafter referred to as "barriers 110*a* through 110*d*", also collectively referred to as "railroad crossing barriers 110" or "barriers 110"). As viewed from the driver of the vehicle 10 that is about to travel across the railroad crossing 100, the barrier 110*a*, which is positioned on the near side of the tracks 104*a*, 104*b*, is referred to as an "entrance barrier", and the barrier 110*b*, which is positioned on the far side of the tracks 104*a*, 104*b*, is referred to as an "exit barrier". As viewed from the driver of another vehicle 112 traveling in the oncoming lane 106*b* and that is about to enter the railroad crossing 100, the barrier 110*c*, which is positioned on the near side of the tracks 104*a*, 104*b*, is referred to as an "entrance barrier", whereas the barrier 110*d*, which is positioned on the far side of the tracks 104*a*, 104*b*, is referred to as an "exit barrier".

The barriers 110*a* through 110*d* have respective barrier bars 120*a* through 120*d* (hereinafter also collectively referred to as "barrier bars 120") and respective barrier actuators 122*a* through 122*d* (hereinafter also collectively referred to as "barrier actuators 122"), which serve as mechanisms for lifting and lowering the barrier bars 120*a* through 120*d*.

Generally, when the vehicle 10 is about to travel across the railroad crossing 100 during a time that the vehicle road 102 is not closed by the railroad crossing barrier 110, the vehicle 10 temporarily stops in front of the entrance barrier 110a. Then, the vehicle 10 drives slowly through the railroad crossing 100.

An area in front of the entrance barrier 110a, i.e., an area where the vehicle 10 decelerates in order to temporarily stop in front of the entrance barrier 110a, will be referred to as a "first area 130", and an area within the railroad crossing 100 between the entrance barrier 110a and the exit barrier 110b will be referred to as a "second area 132".

(2-2. Basic Concept of Railroad-Crossing-Barrier-Related Control Process)

As described above, the ECU 20 according to the first embodiment includes the avoidance action assistance function 88 and the emergency brake function 90 for avoiding a collision between the vehicle 10 and an obstacle (external object). A control process for performing the avoidance action assistance function 88 or the emergency brake function 90 will hereinafter be referred to as an "avoidance control process". The avoidance control process may include other control processes, e.g., a process for displaying a warning on a head-up display, insofar as such other control processes help to avoid a collision between the vehicle 10 and an obstacle (external object).

When the barrier bar 120a of the entrance barrier 110a is being lowered or has been lowered, at a time that the vehicle 10 is about to drive across the railroad crossing 100, e.g., at a time that the vehicle 10 is positioned in the first area 130, if the barrier bar 120a is judged as potentially colliding with the vehicle 10 and the avoidance control process is carried out, then there is a possibility the driver of the vehicle 10 may feel strange or awkward. More specifically, since the driver usually drives the vehicle 10 through the first area 130 while already being aware of the presence of the entrance barrier 110a, the avoidance control process, if carried out on the barrier bar 120a, tends to make the driver feel strange or awkward. The driver also is made to feel strange or awkward if the avoidance control process is carried out on the barrier bar 120b of the exit barrier 110b, when the barrier bar 120b is being lowered or has been lowered at a time that the vehicle 10 is positioned in the second area 132.

According to the first embodiment, the ECU 20 estimates or judges whether or not an external object, which is detected by the forward radar 30 or the rearward radar 32, is the barrier bar 120a of the first railroad crossing barrier 110a or the barrier bar 120b of the second railroad crossing barrier 110b. If the detected external object is the barrier bar 120a or the barrier bar 120b, then the ECU 20 cancels the avoidance control process. At this time, the ECU 20 also estimates the state of the barrier bar 120c of the third railroad crossing barrier 110c and the barrier bar 120d of the fourth railroad crossing barrier 110d.

(2-3. General Flow of Railroad-Crossing-Barrier-Related Control Process According to the First Embodiment)

Figure 4:
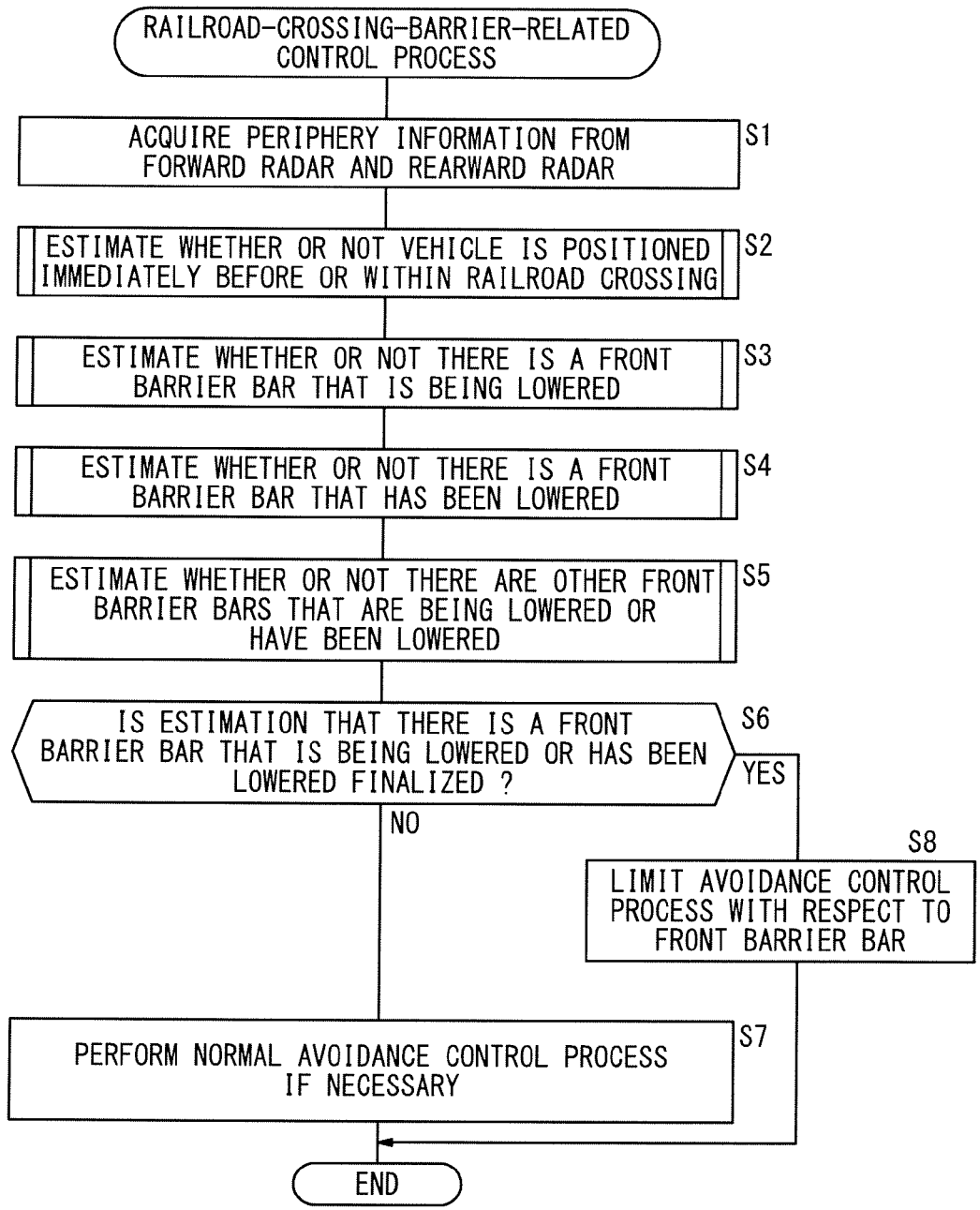
FIG. 4 is a flowchart of a general sequence of a railroad-crossing-barrier-related control process according to the first embodiment of the present invention.

FIG. 4 is a flowchart of a general sequence of the railroad-crossing-barrier-related control process according to the first embodiment. The railroad-crossing-barrier-related control process refers to a control process in relation to the railroad crossing barriers 110a, 110b, 110c, 100d, at a time that the vehicle 10 travels across the railroad crossing 100.

In step S1 of FIG. 4, the ECU 20 (periphery monitoring function 80) acquires information (hereinafter referred to as "periphery information") in relation to the periphery of the vehicle 10 from the forward radar 30 and the rearward radar 32. As described above, the forward radar 30 acquires three-dimensional positional information concerning an area in front of the vehicle 10, and the rearward radar 32 acquires three-dimensional positional information concerning an area behind the vehicle 10.

In step S2, the ECU 20 (periphery monitoring function 80) estimates whether or not the vehicle 10 is positioned immediately in front of the railroad crossing 100, i.e., whether the vehicle 10 is positioned in the first area 130. The ECU 20 also estimates whether or not the vehicle 10 is positioned within the railroad crossing 100, i.e., whether the vehicle 10 is positioned within the second area 132.

In step S3, the ECU 20 (railroad crossing barrier estimating function 92) estimates whether or not there is a front barrier bar 120 front that is being lowered. When the vehicle 10 is positioned in the first area 130, the front barrier bar 120 front refers to the barrier bars 120a, 120b, and when the vehicle 10 is positioned in the second area 132, the front barrier bar 120 front refers only to the barrier bar 120b. In step S4, the ECU 20 (railroad crossing barrier estimating function 92) estimates whether or not there is a front barrier bar 120 front that has been lowered.

In step S5, the ECU 20 (railroad crossing barrier estimating function 92) estimates whether or not there are other barrier bars 120, which are being lowered or have been lowered. Such other barrier bars 120 refer to barrier bars 120 apart from the front barrier bar 120 front, i.e., the rear barrier bar 120 rear or the barrier bars 120c, 120d over the oncoming lane 106b. When the vehicle 10 is positioned in the first area 130, the rear barrier bar 120 rear is not present, and when the vehicle 10 is positioned in the second area 132, the rear barrier bar 120 rear refers to the barrier bar 120a.

In step S6, the ECU 20 (railroad crossing barrier estimating function 92) judges whether or not to finalize the estimation that there is a front barrier bar 120 front, which is being lowered or has been lowered, based on whether or not a later-described front barrier bar finalizing flag FLG7 is 1. If the ECU 20 (railroad crossing barrier estimating function 92) does not finalize the decision that there is a front barrier bar 120 front, which is being lowered or has been lowered (S6: NO), then in step S7, if necessary, the ECU 20 performs the avoidance control process. If the ECU 20 (railroad crossing barrier estimating function 92) has finalized the decision that there is a front barrier bar 120 front, which is being lowered or has been lowered (S6: YES), then in step S8, the ECU 20 limits the avoidance control process with respect to the front barrier bar 120 front. With respect to other objects apart from the external object that is estimated or identified as being the front barrier bar 120 front, the ECU 20 does not limit the avoidance control process, but if necessary, performs the avoidance control process.

(2-4. Estimation of Whether the Vehicle 10 is Positioned Immediately in Front of a Railroad Crossing 100 or Within an Area of the Railroad Crossing 100 (step S2 of FIG. 4))

Figure 5:
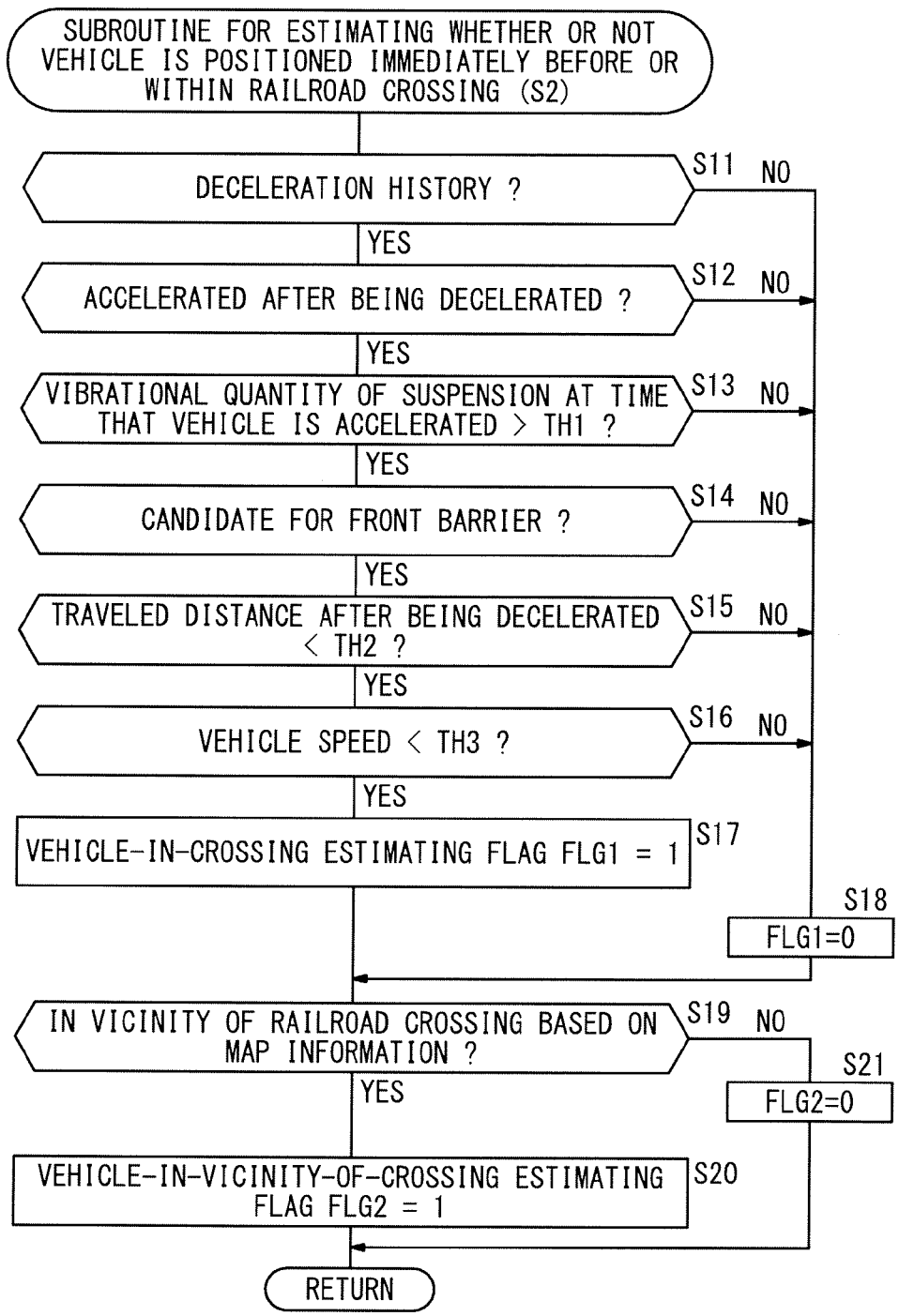
FIG. 5 is a flowchart of a subroutine (details of step S2 in FIG. 4) for estimating whether or not the vehicle is positioned immediately before or within a railroad crossing according to the first embodiment of the present invention.

FIG. 5 is a flowchart of a subroutine (details of step S2 in FIG. 4) for estimating whether or not the vehicle 10 is positioned immediately in front of the railroad crossing 100, or is present within the railroad crossing 100, according to the first embodiment. In step S11 of FIG. 5, the ECU 20 (railroad crossing barrier estimating function 92) judges whether or not the vehicle 10 has a deceleration history. The deceleration history refers to a history of decelerations made by the vehicle 10 in order to temporarily stop in the first area 130. The deceleration history is judged based on the vehicle body speed Vv from the vehicle body speed sensor 40, for example. Once a deceleration history has been recorded, the deceleration history is maintained continuously over a given period or distance (including an error), which is assumed to be required until the vehicle 10 travels past the railroad crossing 100 after the vehicle 10 has started accelerating (moving forward).

If there is a deceleration history (S11: YES), then in step S12, the ECU 20 (railroad crossing barrier estimating function 92) judges whether or not the vehicle 10 is accelerated after the vehicle 10 has been decelerated. The acceleration, which is judged in step S12, refers to an acceleration made by the vehicle 10 in order to travel past the railroad crossing 100, after the vehicle 10 has temporarily stopped in front of the entrance barrier bar 120a.

If the vehicle 10 is accelerated after the vehicle 10 has been decelerated (S12: YES), then in step S13, the ECU 20 (railroad crossing barrier estimating function 92) judges whether or not the vibrational quantity V1 of the suspension 66 at the time that the vehicle 10 is accelerated (and after the vehicle 10 has been accelerated) exceeds a first threshold value TH1. The first threshold value TH1 is a threshold value for the vibrational quantity V1, by which it is judged whether or not the vehicle 10 is traveling within the area of the railroad crossing 100 (second area 132). More specifically, when the vehicle 10 is traveling within the area of the railroad crossing 100 (second area 132), the vehicle 10 frequently vibrates significantly due to the rail tracks 104a, 104b. Step S13 represents a process for estimating whether or not the vehicle 10 is positioned within the area of the railroad crossing 100 based on the vibrational quantity V1.

If the vibrational quantity V1 of the suspension 66 during a time that the vehicle 10 is accelerated (or after the vehicle 10 is accelerated) exceeds the first threshold value TH1 (S13: YES), then in step S14, the ECU 20 (railroad crossing barrier estimating function 92) determines whether or not there is an external object that serves as a candidate for a front barrier 110 front. When the vehicle 10 is positioned in the first area 130, the front barrier 110 front refers to the first and second barriers 110a, 110b, and when the vehicle 10 is positioned in the second area 132, the front barrier 110 front refers only to the second barrier 110b.

More specifically, the ECU 20 (railroad crossing barrier estimating function 92) judges whether or not there is a still object having a transverse width W (see FIG. 7), the absolute value of which is equal to or smaller than a transverse width W1, and having a height H1, the absolute value of which is equal to or greater than a height H1, at a position outside of the vehicle road 102, e.g., within a given range from an edge of the vehicle road 102. The transverse width W1 and the height H1 serve as threshold values by which the presence of a railroad crossing barrier 110 is estimated.

Instead of judging whether or not there is an external object that serves as a candidate for the front barrier 110 front, the ECU 20 (railroad crossing barrier estimating function 92) may judge whether or not there is an external object that serves as a candidate for the front barrier bar 120 front. More specifically, the ECU 20 (railroad crossing barrier estimating function 92) may judge whether or not there is a still object having a left end (one end) that exists at a position outside of the vehicle road 102, e.g., within a given range from an edge of the vehicle road 102, a width Ww (not limited to a transverse width), the absolute value of which is equal to or smaller than a transverse width W2, and a length L, the absolute value of which is equal to or greater than a length L1. The width W2 and the length L1 serve as threshold values by which the presence of a railroad crossing barrier bar 120 is estimated.

If an external object exists as a candidate for the front barrier 110 front (S14: YES), then in step S15, the ECU 20 (railroad crossing barrier estimating function 92) judges whether or not a distance D1, which the vehicle 10 has traveled from the position where the deceleration history in step S11 was recorded, is smaller than a second threshold value TH2.

The second threshold value TH2 is a threshold value for the traveled distance D1, by which it is judged whether or not the vehicle 10 is traveling within the railroad crossing 100. More specifically, the width of the railroad crossing 100 (the length in the traveling direction of the vehicle 10, or the vertical length in FIG. 3) is considered to fall within a certain range, although the width may differ somewhat depending on the type of railroad crossing 100. Using the second threshold value TH2, the ECU 20 (railroad crossing barrier estimating function 92) is able to judge whether or not the vehicle 10 is positioned within the railroad crossing 100 by comparing the traveled distance D1 traversed by the vehicle 10 after the vehicle 10 has stopped temporarily in front of the entrance barrier bar 120a.

If the traveled distance D1 is smaller than the second threshold value TH2 (S15: YES), then in step S16, the ECU 20 (railroad crossing barrier estimating function 92) determines whether or not the present vehicle speed V is lower than a third threshold value TH3. The vehicle body speed Vv, for example, may be used directly as the vehicle speed V. Alternatively, an average value of the speeds Vw1, Vw2, Vw3, Vw4 of the road wheels may be used as the vehicle speed V. The third threshold value TH3 is a threshold value for the vehicle speed V, by which it is judged whether or not the vehicle 10 is traveling within the railroad crossing 100. More specifically, when the vehicle 10 is traveling within the railroad crossing 100, the vehicle speed V is low because the vehicle 10 is required to drive slowly. Therefore, if the vehicle speed V is not lower than the third threshold value TH3, it may be assumed that the vehicle 10 is not traveling within the railroad crossing 100.

If the vehicle speed V is lower than the third threshold value TH3 (S16: YES), then in step S17, the ECU 20 (railroad crossing barrier estimating function 92) sets a vehicle-in-crossing estimating flag FLG1 to 1. If the answer to any one of steps S11 through S16 is negative, then the ECU 20 (railroad crossing barrier estimating function 92) sets the vehicle-in-crossing estimating flag FLG1 to 0. The vehicle-in-crossing estimating flag FLG1 represents a decision concerning an estimation as to whether or not the vehicle 10 is positioned within the railroad crossing 100. More specifically, when the vehicle-in-crossing estimating flag FLG1 is 0, an indication is given that the ECU 20 (railroad crossing barrier estimating function 92) estimates that the vehicle 10 is not positioned within the area of the railroad crossing 100, i.e., the second area 132, and when the vehicle-in-crossing estimating flag FLG1 is 1, an indication is given that the ECU 20 (railroad crossing barrier estimating function 92) estimates that the vehicle 10 is positioned within the area of the railroad crossing 100.

After step S17 or step S18, in step S19, the ECU 20 (railroad crossing barrier estimating function 92) estimates whether or not the vehicle 10 is positioned in the vicinity of the railroad crossing 100, based on the map information from the navigation system 14. More specifically, the ECU 20 asks the navigation system 14 if the present position of the vehicle 10 is in the vicinity of the railroad crossing 100, and the navigation system 14 judges whether or not the present position of the vehicle 10 is in the vicinity of the railroad crossing 100 using the map information from the map information database, and sends the decision result to the ECU 20.

The vicinity of the railroad crossing 100 may imply only the first area 130 and the second area 132, if the navigation system 14 has a high position judgment accuracy level. On the other hand, if the navigation system 14 does not have a high position judgment accuracy level, then the vicinity of the railroad crossing 100 may imply not only the first area 130 and the second area 132, but also other areas.

If the vehicle 10 is positioned within the vicinity of the railroad crossing 100 according to the map information (S19: YES), then in step S20, the ECU 20 (railroad crossing barrier estimating function 92) sets a vehicle-in-vicinity-of-crossing estimating flag FLG2 to 1. If the vehicle 10 is not positioned within the vicinity of the railroad crossing 100 according to the map information (S19: NO), then in step S21, the ECU 20 (railroad crossing barrier estimating function 92) sets the vehicle-in-vicinity-of-crossing estimating flag FLG2 to 0. The vehicle-in-vicinity-of-crossing estimating flag FLG2 represents a decision as to whether or not the vehicle 10 is positioned within the vicinity of the railroad crossing 100. More specifically, when the vehicle-in-vicinity-of-crossing estimating flag FLG2 is 0, an indication is given that the ECU 20 (railroad crossing barrier estimating function 92) estimates that the vehicle 10 is not positioned within the vicinity of the railroad crossing 100. Alternatively, when the vehicle-in-vicinity-of-crossing estimating flag FLG2 is 1, an indication is given that the ECU 20 (railroad crossing barrier estimating function 92) estimates that the vehicle 10 is positioned within the vicinity of the railroad crossing 100.

(2-5. Estimation as to Whether there is a Front Barrier Bar 120 Front that is being Lowered (Step S3 of FIG. 4))

Figure 6:
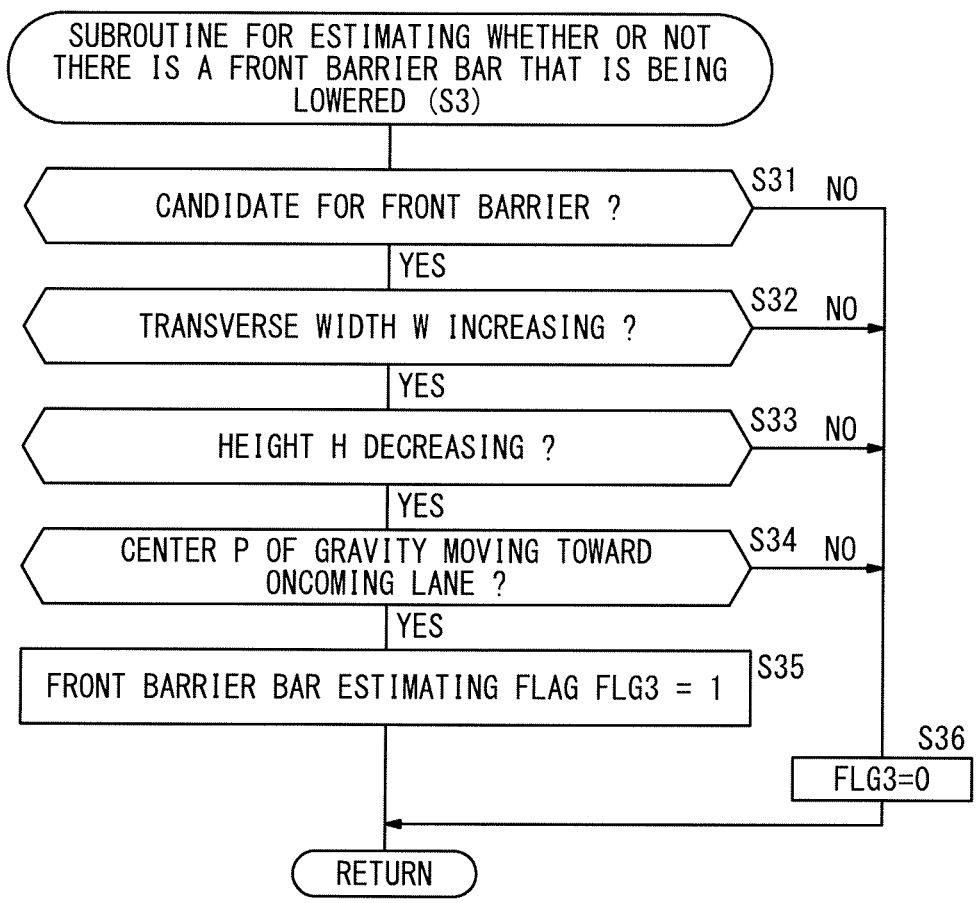
FIG. 6 is a flowchart of a subroutine (details of step S3 in FIG. 4) for estimating whether or not there is a front barrier bar that is currently being lowered according to the first embodiment of the present invention.
Figure 7:
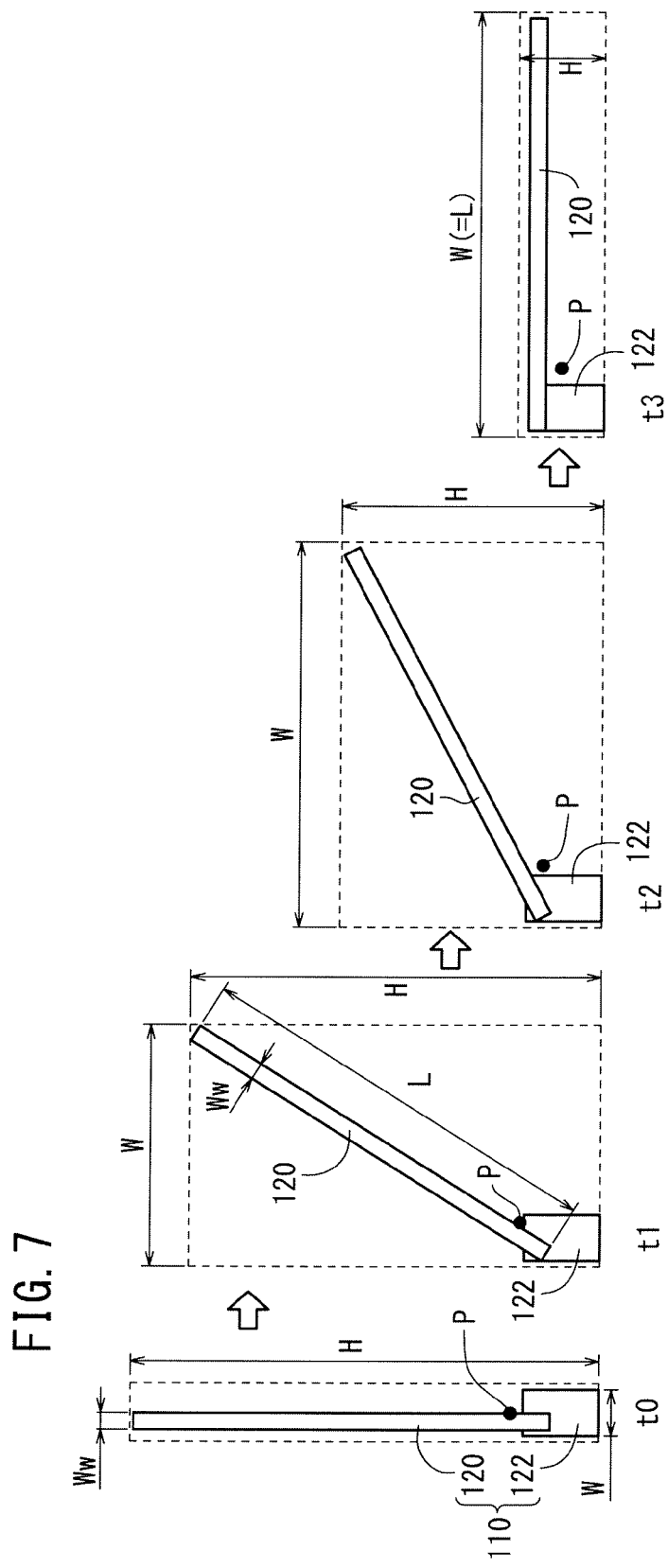
FIG. 7 is a view showing the manner in which a barrier bar of a railroad crossing barrier is lowered.

FIG. 6 is a flowchart of a subroutine (details of step S3 in FIG. 4) for estimating whether or not there is a front barrier bar 120 front, which is being lowered, according to the first embodiment. FIG. 7 is a view showing the manner in which the barrier bar 120 of the railroad crossing barrier 110 is lowered. In FIG. 7, the state of the railroad crossing barrier 110 changes from time t0 successively to times t1, t2, and t3.

The subroutine shown in FIG. 6 serves to estimate that the front barrier bar 120 front is currently being lowered based on changes in the overall posture of the front barrier 110 front. More specifically, provided the front barrier 110 front is seen as a whole, when the front barrier bar 120 front starts being lowered, the transverse width W (see FIG. 7) of the front barrier 110 front gradually increases and the height H thereof gradually decreases, while at the same time, the center P of gravity of the front barrier 110 front moves to the right as shown in FIG. 7, or stated otherwise, the center P of gravity moves toward the oncoming lane 106b as shown in FIG. 3. Therefore, based on the transverse width W, the height H, and the position of the center P of gravity, it is possible to judge whether or not the front barrier bar 120 front is currently being lowered, although as described later, it is not necessary to judge the status of the front barrier bar 120 front based on all of these dimensions.

In step S31 of FIG. 6, the ECU 20 (railroad crossing barrier estimating function 92) judges whether or not there is a candidate for the front barrier 110 front. More specifically, the ECU 20 (railroad crossing barrier estimating function 92) judges whether or not there is a still object at a position outside of the vehicle road 102, e.g., within a given range from an edge of the vehicle road 102, and having a transverse width W that is equal to or smaller than the transverse width W1, and a height H that is equal to or greater than the height H1.

If there is a candidate for the front barrier 110 front, then in step S32, the ECU 20 (railroad crossing barrier estimating function 92) judges whether or not the transverse width W of the front barrier 110 front is increasing.

If the transverse width W of the front barrier 110 front is increasing (S32: YES), then in step S33, the ECU 20 (railroad crossing barrier estimating function 92) judges whether or not the height H of the front barrier 110 front is decreasing.

If the height H of the front barrier 110 front is decreasing (S33: YES), then in step S34, the ECU 20 (railroad crossing barrier estimating function 92) judges whether or not the center P of gravity of the front barrier 110 front is moving toward the oncoming lane 106b.

If the center P of gravity of the front barrier 110 front is moving toward the oncoming lane 106b (S34: YES), then in step S35, the ECU 20 (railroad crossing barrier estimating function 92) sets a front barrier bar estimating flag FLG3 to 1. If the answer to any one of steps S31 through S34 is negative, then in step S36, the ECU 20 (railroad crossing barrier estimating function 92) sets the front barrier bar estimating flag FLG3 to 0.

The front barrier bar estimating flag FLG3 represents a decision concerning an estimation as to whether or not there is a front barrier bar 120 front that is being lowered. More specifically, when the front barrier bar estimating flag FLG3 is 0, an indication is given that the ECU 20 (railroad crossing barrier estimating function 92) has estimated that a front barrier bar 120 front does not exist that is currently being lowered. On the other hand, when the front barrier bar estimating flag FLG3 is 1, an indication is given that the ECU 20 (railroad crossing barrier estimating function 92) has estimated that a front barrier bar 120 front is present that is currently being lowered.

(2-6. Estimation as to Whether there is a Front Barrier Bar 120 Front that has been Lowered (Step S4 in FIG. 4))

Figure 8:
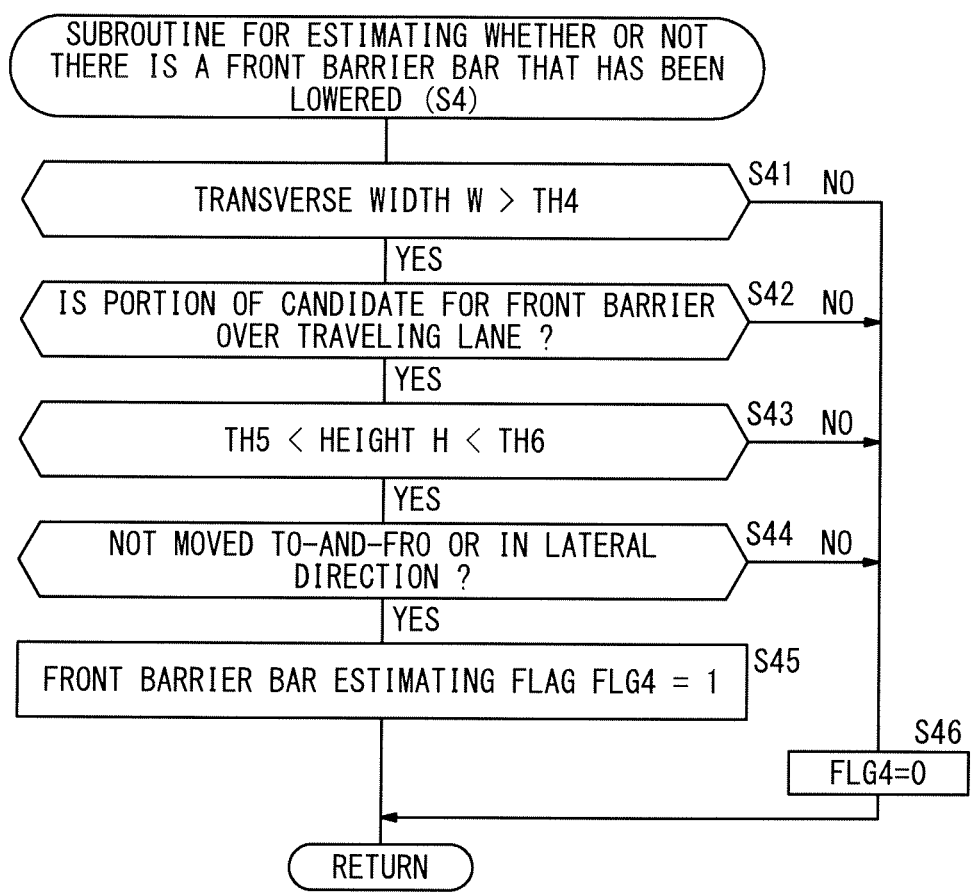
FIG. 8 is a flowchart of a subroutine (details of step S4 in FIG. 4) for estimating whether or not the front barrier bar has been lowered according to the first embodiment of the present invention.

FIG. 8 is a flowchart of a subroutine (details of step S4 in FIG. 4) for estimating whether or not the front barrier bar 120 front has been lowered according to the first embodiment. In step S41 of FIG. 8, the ECU 20 (railroad crossing barrier estimating function 92) judges whether or not the transverse width W of the front barrier 110 front exceeds a fourth threshold value TH4. The fourth threshold value TH4 represents the transverse width (traveling lane width W3) of the lane 106a on which the vehicle 10 is travelling, for example. The ECU 20 (railroad crossing barrier estimating function 92) makes such a judgment in order to identify the barrier bar 120, based on the fact that the length of a general barrier bar is equal to or longer than the width of one lane. Certain barrier bars are designed to block two lanes (the traveling lane 106a and the oncoming lane 106b) at the same time. The ECU 20 (railroad crossing barrier estimating function 92) may make other judgments, insofar as such judgments are capable of identifying a barrier bar based on the length thereof.

If the transverse width W is greater than the fourth threshold value TH4 (S41: YES), then in step S42, the ECU 20 (railroad crossing barrier estimating function 92) judges whether or not a portion of the candidate for the front barrier 110 front, i.e., a portion of the candidate for the front barrier bar 120 front, is positioned over the traveling lane 106a. In this manner, the ECU 20 (railroad crossing barrier estimating function 92) can identify the barrier bar 120 from a positional relationship between the front barrier 110 front (front barrier bar 120 front) and the traveling lane 106a.

If a portion of the candidate for the front barrier 110 front is positioned over the traveling lane 106a (S42: YES), then in step S43, the ECU 20 (railroad crossing barrier estimating function 92) judges whether or not the height H of the front barrier 110 front is greater than a fifth threshold value TH5 and smaller than a sixth threshold value TH6. The fifth threshold value TH5 and the sixth threshold value TH6 are threshold values for identifying a barrier bar 120, which has been lowered, based on the height of the lowered barrier bar 120. More specifically, the lowered barrier bar 120 stops at a certain height from the ground so as to prevent vehicles 10 or people from entering into the railroad crossing 100. It is possible for the lowered barrier bar 120 to be estimated or identified based on the height H, by judging whether an external object is present in a certain height range within which the lowered barrier bar 120 is possibly stopped.

If the height H of the front barrier 110 front is greater than the fifth threshold value TH5 and is smaller than the sixth threshold value TH6 (S43: YES), then in step S44, the ECU 20 (railroad crossing barrier estimating function 92) determines whether or not the candidate for the front barrier 110 front (external object) has moved to-and-fro or in a lateral direction. When the barrier bar 120 has been lowered, the barrier bar 120 is kept still. If the candidate for the front barrier 110 front (external object) is moving to-and-fro or in a lateral direction, then it can be estimated or judged that the candidate is not the barrier 110. In view of possible flexing of the barrier bar 120, it is possible to judge that the candidate has not moved, even if the candidate has moved within a certain range.

If the candidate for the front barrier 110 front has not moved to-and-fro or in a lateral direction (S44: YES), then in step S45, the ECU 20 (railroad crossing barrier estimating function 92) sets a front barrier bar estimating flag FLG4 to 1. If the answer to any one of steps S41 through S44 is negative, then in step S46, the ECU 20 (railroad crossing barrier estimating function 92) sets the front barrier bar estimating flag FLG4 to 0.

The front barrier bar estimating flag FLG4 represents a decision concerning an estimation as to whether or not there is a front barrier bar 120 front that has been lowered. More specifically, when the front barrier bar estimating flag FLG4 is 0, an indication is given that the ECU 20 (railroad crossing barrier estimating function 92) estimates that a front barrier bar 120 front does not exist that has been lowered, and when the front barrier bar estimating flag FLG4 is 1, an indication is given that the ECU 20 (railroad crossing barrier estimating function 92) estimates that there is a front barrier bar 120 front that has been lowered.

(2-7. Estimation as to Whether or not there is Another Front Barrier Bar 120 Front, which is being Lowered or has Been Lowered (step S5 in FIG. 4))

Figure 9:
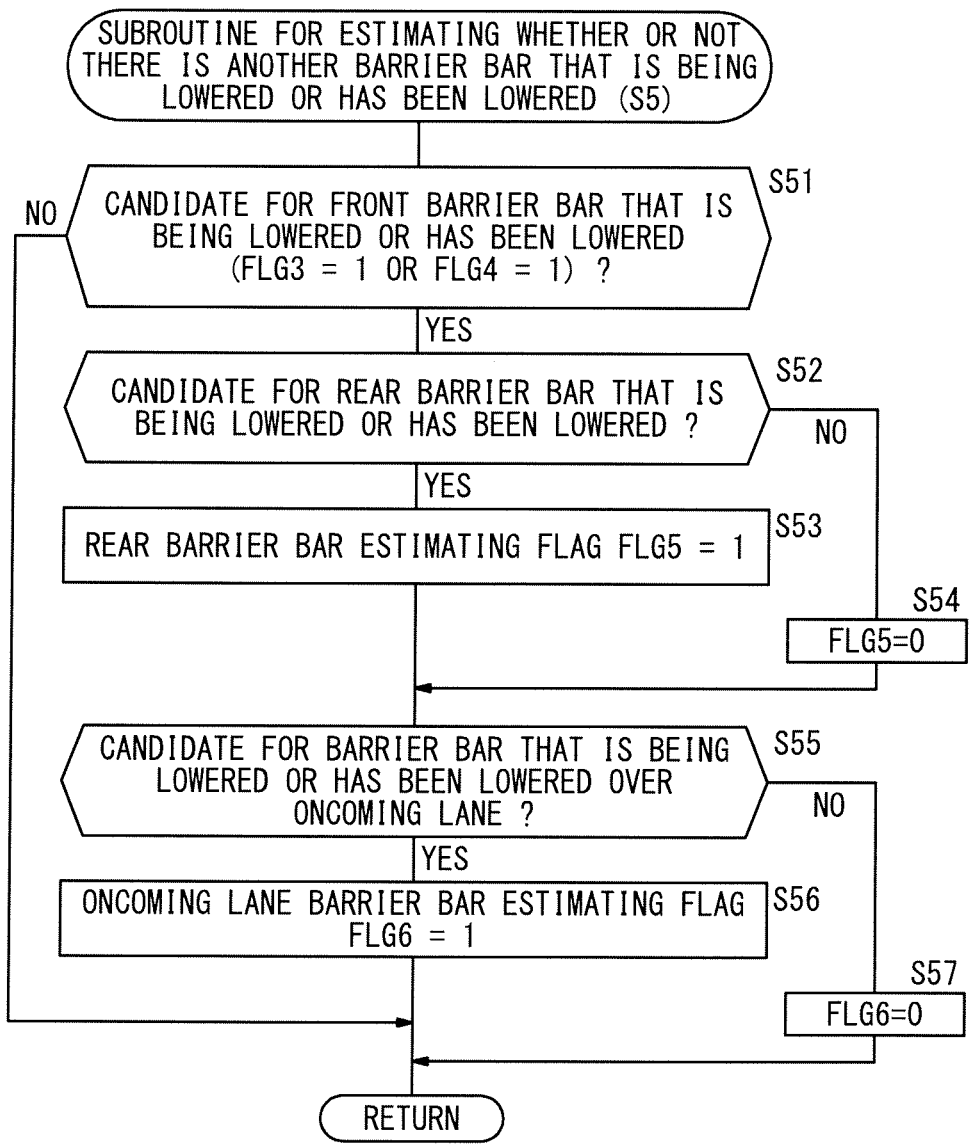
FIG. 9 is a flowchart of a subroutine (details of step S5 in FIG. 4) for estimating whether or not there is another barrier bar (a barrier bar different from the front barrier bar referred to above), which is currently being lowered or has been lowered, according to the first embodiment of the present invention.

FIG. 9 is a flowchart of a subroutine (details of step S5 in FIG. 4) for estimating whether or not there is another barrier bar (a barrier bar 120 that differs from the front barrier bar 120 front), which is being lowered or has been lowered, according to the first embodiment. In step S51 shown in FIG. 9, the ECU 20 (railroad crossing barrier estimating function 92) judges whether or not there is a candidate for the front barrier bar 120 front, which is being lowered or has been lowered, as a result of the sequences shown in FIGS. 6 and 8. More specifically, the ECU 20 (railroad crossing barrier estimating function 92) judges whether or not the front barrier bar estimating flag FLG3 or FLG4 is 1. If the front barrier bar estimating flags FLG and FLG4 are 0, thus indicating that there a candidate for the front barrier bar 120 front does not exist, which is being lowered or has been lowered (S51: NO), then the present sequence is brought to an end. If the front barrier bar estimating flag FLG3 or FLG4 is 1, thus indicating that there is a candidate for the front barrier bar 120 front, which is being lowered or has been lowered (S51: YES), then control proceeds to step S52.

In step S52, the ECU 20 (railroad crossing barrier estimating function 92) judges whether or not there is a candidate for the rear barrier bar 120 rear, which is being lowered or has been lowered. More specifically, the ECU 20 (railroad crossing barrier estimating function 92) makes a judgment by performing the same sequences as the sequences of FIGS. 6 and 8, using the output signal from the rearward radar 32.

If there is a candidate for the rear barrier bar 120 rear, which is being lowered or has been lowered (S52: YES), then in step S53, the ECU 20 (railroad crossing barrier estimating function 92) sets a rear barrier bar estimating flag FLG5 to 1. If a candidate for the rear barrier bar 120 rear does not exist, which is being lowered or has been lowered (S52: NO), then in step S54, the ECU 20 (railroad crossing barrier estimating function 92) sets the rear barrier bar estimating flag FLG5 to 0.

The rear barrier bar estimating flag FLG5 represents a decision concerning an estimation as to whether or not there is a candidate for the rear barrier bar 120 rear, which is being lowered or has been lowered. More specifically, if the rear barrier bar estimating flag FLG5 is 0, an indication is given that the ECU 20 (railroad crossing barrier estimating function 92) estimates that a rear barrier bar 120 rear does not exist, which is being lowered or has been lowered, and if the rear barrier bar estimating flag FLG5 is 1, an indication is given that the ECU 20 (railroad crossing barrier estimating function 92) estimates that there is a rear barrier bar 120 rear, which is being lowered or has been lowered.

In step S55, the ECU 20 (railroad crossing barrier estimating function 92) judges whether or not there are candidates for the barrier bars 120c, 120d, which are being lowered or have been lowered, over the oncoming lane 106b. More specifically, the ECU 20 (railroad crossing barrier estimating function 92) makes a judgment by performing the same sequences as the sequence of FIGS. 6 and 8, on other barrier bars 120 apart from the front barrier bar 120 front and the rear barrier bar 120 rear, i.e., the barrier bars 120c, 120d over the oncoming lane 106b, using output signals from the forward radar 30 and the rearward radar 32.

If there are candidates for the barrier bars 120c, 120d, which are being lowered or have been lowered over the oncoming lane 106b (S55: YES), then in step S56, the ECU 20 (railroad crossing barrier estimating function 92) sets an oncoming lane barrier bar estimating flag FLG6 to 1. If candidates do not exist for the barrier bars 120c, 120d, which are being lowered or have been lowered over the oncoming lane 106b (S55: NO), then in step S57, the ECU 20 (railroad crossing barrier estimating function 92) sets the oncoming lane barrier bar estimating flag FLG6 to 0.

The oncoming lane barrier bar estimating flag FLG6 represents a decision concerning an estimate as to whether or not there are barrier bars 120c, 120d, which are being lowered or have been lowered over the oncoming lane 106b. More specifically, when the oncoming lane barrier bar estimating flag FLG6 is 0, an indication is given that the ECU 20 (railroad crossing barrier estimating function 92) estimates that barrier bars 120c, 120d do not exist, which are being lowered or have been lowered over the oncoming lane 106b, and when the oncoming lane barrier bar estimating flag FLG6 is 1, an indication is given that the ECU 20 (railroad crossing barrier estimating function 92) estimates that there are barrier bars 120c, 120d, which are being lowered or have been lowered over the oncoming lane 106b.

(2-8. Finalizing Estimation that there is a Front Barrier Bar 120 Front that is being Lowered or has been Lowered (step S6 in FIG. 4))

Figure 10:
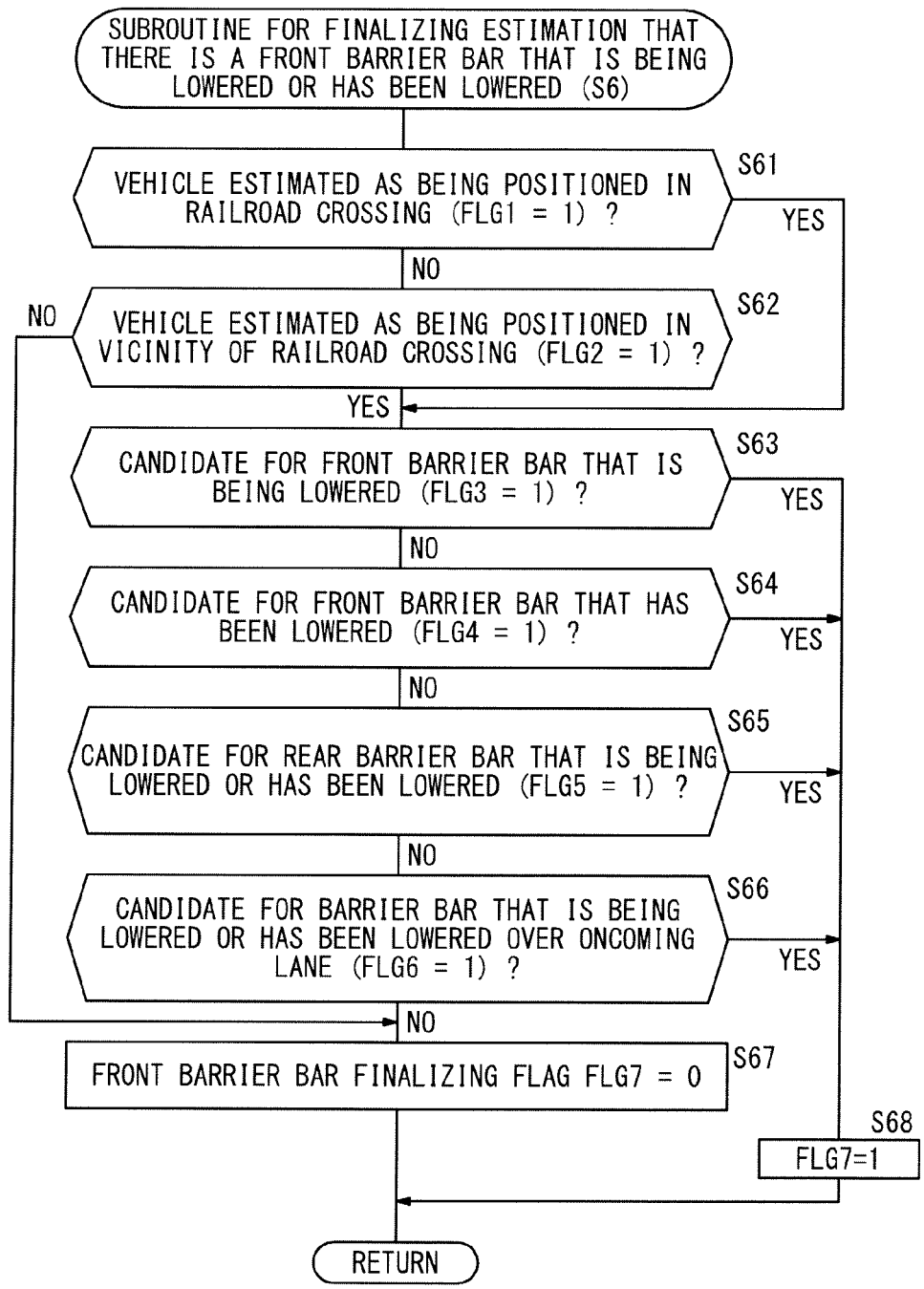
FIG. 10 is a flowchart of a subroutine (details of step S6 in FIG. 4) for finalizing an estimation indicative of a front barrier bar, which is currently being lowered or has been lowered, according to the first embodiment of the present invention.

FIG. 10 is a flowchart of a subroutine (details of step S6 in FIG. 4) for finalizing an estimation that a front barrier bar 120 front exists, which is being lowered or has been lowered according to the first embodiment. In step S61 of FIG. 10, the ECU 20 (railroad crossing barrier estimating function 92) confirms whether or not it has estimated that the vehicle 10 is positioned in a railroad crossing 100. More specifically, the ECU 20 (railroad crossing barrier estimating function 92) confirms whether or not the vehicle-in-crossing estimating flag FLG1 has been set to 1 in the sequence of FIG. 5. If the ECU 20 (railroad crossing barrier estimating function 92) has estimated that the vehicle 10 is positioned in the railroad crossing 100 (S61: YES), then control proceeds to step S63. If the ECU 20 (railroad crossing barrier estimating function 92) has not estimated that the vehicle 10 is positioned in the railroad crossing 100 (S61: NO), then control proceeds to step S62.

In step S62, the ECU 20 (railroad crossing barrier estimating function 92) confirms whether or not an estimation has been made that the vehicle-in-vicinity-of-crossing estimating flag FLG2 is set to 1 in the sequence of FIG. 5. If the ECU 20 (railroad crossing barrier estimating function 92) has estimated that the vehicle 10 is positioned in the vicinity of the railroad crossing 100 (S62: YES), then control proceeds to step S63. If the ECU 20 (railroad crossing barrier estimating function 92) has not estimated that the vehicle 10 is positioned in the vicinity of the railroad crossing 100 (S62: NO), then control proceeds to step S67.

In step S63, the ECU 20 (railroad crossing barrier estimating function 92) confirms whether or not an estimation has been made that there is a candidate for the front barrier bar 120 front that is being lowered. More specifically, the ECU 20 (railroad crossing barrier estimating function 92) confirms whether or not the front barrier bar estimating flag FLG3 is set to 1 in the sequence of FIG. 6. If the ECU 20 (railroad crossing barrier estimating function 92) has estimated that there is a candidate for the front barrier bar 120 front that is being lowered (S63: YES), then control proceeds to step S68. If the ECU 20 (railroad crossing barrier estimating function 92) has not estimated that there is a candidate for the front barrier bar 120 front that is being lowered (S63: NO), then control proceeds to step S64.

In step S64, the ECU 20 (railroad crossing barrier estimating function 92) confirms whether or not an estimation has been made that there is a candidate for the front barrier bar 120 front that has been lowered. More specifically, the ECU 20 (railroad crossing barrier estimating function 92) confirms whether or not the front barrier bar estimating flag FLG4 has been set to 1 in the sequence of FIG. 8. If the ECU 20 (railroad crossing barrier estimating function 92) has estimated that a candidate exists for the front barrier bar 120 front that has been lowered (S64: YES), then control proceeds to step S68. If the ECU 20 (railroad crossing barrier estimating function 92) has not estimated that there is a candidate for the front barrier bar 120 front that has been lowered (S64: NO), then control proceeds to step S65.

In step S65, the ECU 20 (railroad crossing barrier estimating function 92) confirms whether or not an estimation has been made that there is a candidate for the rear barrier bar 120 rear, which is being lowered or has been lowered. More specifically, the ECU 20 (railroad crossing barrier estimating function 92) confirms whether or not the rear barrier bar estimating flag FLG5 has been set to 1 in the sequence of FIG. 9. If the ECU 20 (railroad crossing barrier estimating function 92) has estimated that there is a candidate for the rear barrier bar 120 rear, which is being lowered or has been lowered (S65: YES), then control proceeds to step S68. If the ECU 20 (railroad crossing barrier estimating function 92) has not estimated that there is a candidate for the rear barrier bar 120 rear, which is being lowered or has been lowered (S65: NO), then control proceeds to step S66.

In step S66, the ECU 20 (railroad crossing barrier estimating function 92) confirms whether or not an estimation has been made that there are candidates for the barrier bars 120c, 120d, which are being lowered or have been lowered over the oncoming lane 106b. More specifically, the ECU 20 (railroad crossing barrier estimating function 92) confirms whether or not the oncoming lane barrier bar estimating flag FLG6 is set to 1 in the sequence of FIG. 9. If the ECU 20 (railroad crossing barrier estimating function 92) has estimated that candidates exist for the barrier bars 120c, 120d, which are being lowered or have been lowered over the oncoming lane 106b (S66: YES), then control proceeds to step S68.

If the answer to either one of steps S62 or S66 is negative (S62: N0 or S66: NO), then in step S67, the ECU 20 (railroad crossing barrier estimating function 92) sets the front barrier bar finalizing flag FLG7 to 0. If the answer to any of steps S63 through S66 is affirmative, then in step S68, the ECU 20 (railroad crossing barrier estimating function 92) sets the front barrier bar finalizing flag FLG7 to 1.

The front barrier bar finalizing flag FLG7 represents a decision in relation to finalizing whether or not there is a front barrier bar 120 front, which is being lowered or has been lowered. More specifically, when the front barrier bar finalizing flag FLG7 is 0, an indication is given that the ECU 20 (railroad crossing barrier estimating function 92) has finalized the estimation that there a front barrier bar 120 front does not exist, which is being lowered or has been lowered, and when the front barrier bar finalizing flag FLG7 is 1, an indication is given that the ECU 20 (railroad crossing barrier estimating function 92) has finalized the estimation that there is a front barrier bar 120 front, which is being lowered or has been lowered.

According to the first embodiment, as described above, if any one of the vehicle-in-crossing estimating flag FLG1 (FIG. 5), the vehicle-in-vicinity-of-crossing estimating flag FLG2 (FIG. 5), the front barrier bar estimating flag FLG3 (FIG. 6), the front barrier bar estimating flag FLG4 (FIG. 8), the rear barrier bar estimating flag FLG5 (FIG. 9), and the oncoming lane barrier bar estimating flag FLG6 (FIG. 9) is 1, the ECU 20 (railroad crossing barrier estimating function 92) does not immediately finalize the estimation that a front barrier bar 120 front exists, which is being lowered or has been lowered.

Instead, alternatively, if either one of the vehicle-in-crossing estimating flag FLG1 or the vehicle-in-vicinity-of-crossing estimating flag FLG2 is 1, and if any one of the front barrier bar estimating flag FLG3, the front barrier bar estimating flag FLG4, the rear barrier bar estimating flag FLG5, and the oncoming lane barrier bar estimating flag FLG6 is 1, the ECU 20 (railroad crossing barrier estimating function 92) finalizes the estimation that a front barrier bar 120 front exists, which is being lowered or has been lowered. Such a judgment makes it possible to increase the accuracy of the estimation that there is a front barrier bar 120 front, which is being lowered or has been lowered.

Further, when any one of the vehicle-in-crossing estimating flag FLG1, the vehicle-in-vicinity-of-crossing estimating flag FLG2, the front barrier bar estimating flag FLG3, the front barrier bar estimating flag FLG4, the rear barrier bar estimating flag FLG5, and the oncoming lane barrier bar estimating flag FLG6 is 1, the ECU 20 (railroad crossing barrier estimating function 92) may be capable of finalizing the estimation that a front barrier bar 120 front exists, which is being lowered or has been lowered.

3. Advantages of the First Embodiment

According to the first embodiment, as described above, if the front barrier bar 120 front is being lowered or has been lowered (S6: YES in FIG. 4), the vehicle 10 terminates the avoidance control process (i.e., stops assisting the driver in turning the steering wheel 60, automatically braking the vehicle 10, outputting the warning sound, etc.) with respect to the front barrier 110 front. Consequently, the driver is prevented from feeling strange or awkward.

According to the first embodiment, furthermore, if at least one of an external object the transverse width W of which increases with time (see step S32 in FIG. 6), and an external object having a given length at a certain height from the ground (see steps S41, S43 in FIG. 8) is detected, the external object is estimated as representing the railroad crossing barrier 110. Therefore, even if the judgment accuracy or performance of the forward radar 30 (external object position judger) is relatively low, it is still possible to estimate the external object as the railroad crossing barrier 110.

According to the first embodiment, furthermore, the vehicle 10, which is positioned in front of the railroad crossing 100 or in the railroad crossing 100, is detected based on behavior exhibited by the vehicle 10 when the vehicle 10 moves through the railroad crossing 100 (see steps S11 through S13, S15, S16 in FIG. 5), or based on map information from the navigation system 14 (see step S19). Therefore, the accuracy with which the railroad crossing barrier 110 can be determined is increased. In addition, it still is possible to estimate the presence of the railroad crossing barrier 110 even when the barrier bar 120 is being lowered.

B. Second Embodiment

1. Configuration (1-1. Overall Configuration)

Figure 11:
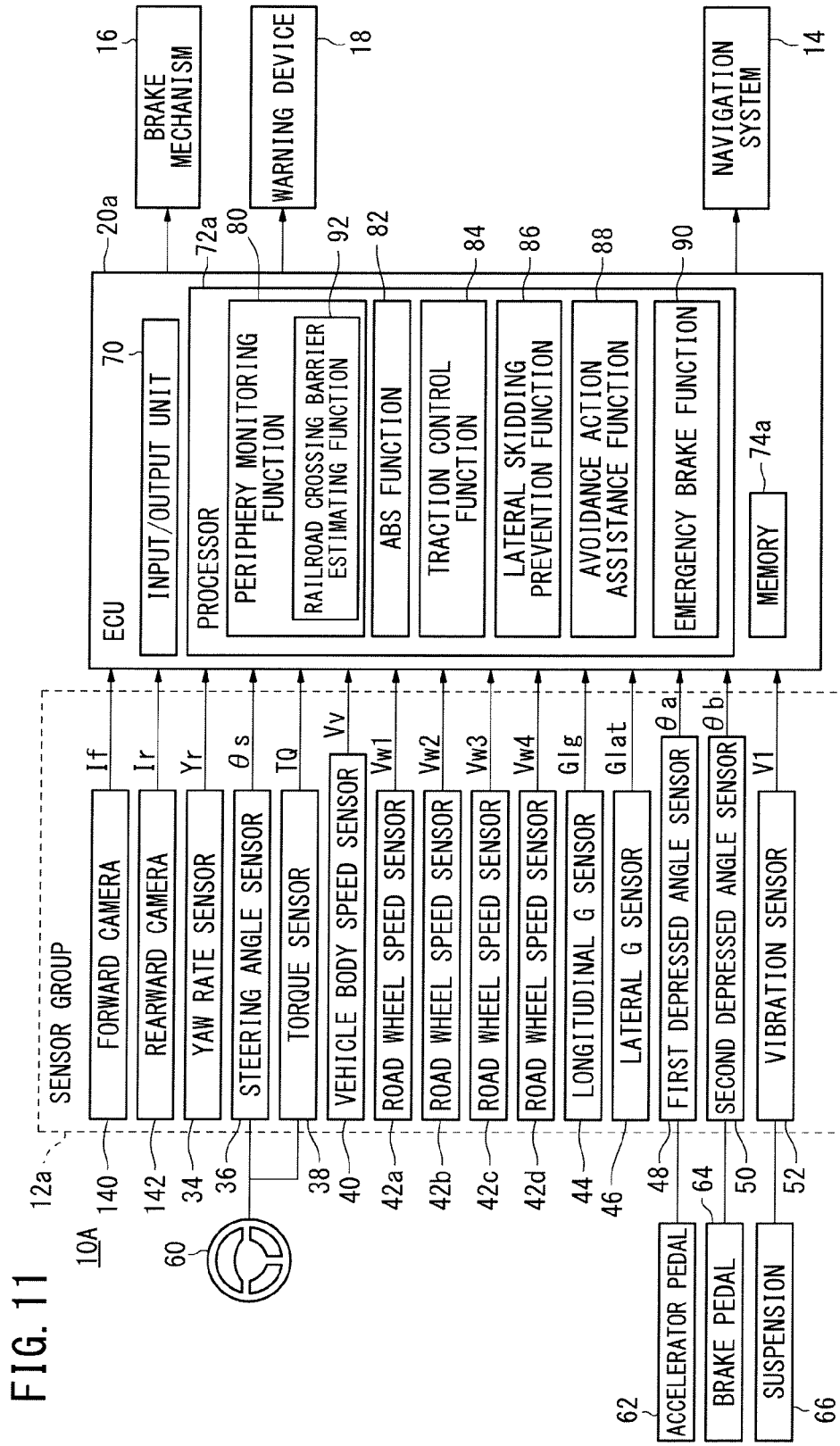
FIG. 11 is a block diagram of a vehicle according to a second embodiment of the present invention.

FIG. 11 shows in block form a vehicle (mobile body) 10A (hereinafter also referred to as a "host vehicle 10A") according to a second embodiment of the present invention.

The vehicle 10A according to the second embodiment has basically the same configuration as the vehicle 10 according to the first embodiment, but differs therefrom in that a sensor group 12a of the vehicle 10A includes a forward camera (external object position judger, image capturing device) 140 and a rearward camera 142, instead of the forward radar 30 and the rearward radar 32. Also, an electronic control unit (railroad crossing barrier estimating apparatus) 20a (hereinafter referred to as an "ECU 20a") according to the second embodiment performs the same functions as the ECU 20 according to the first embodiment, except that such functions are performed based on output signals from the forward camera 140 and the rearward camera 142. Components according to the second embodiment, which are identical to those according to the first embodiment, are denoted by identical reference characters, and such features will not be described in detail.

(1-2. Forward Camera 140 and Rearward Camera 142)

The forward camera 140 is an image capturing device mounted on a front windshield or the like, not shown, of the vehicle 10A. The forward camera 140 captures an image (front image If) of a forward area in front of the vehicle 10A, and sends a captured front image If to the ECU 20a. Based on the front image If from the forward camera 140, the ECU 20a detects the distance (forward relative distance Df) [m] to a front obstacle or external object, e.g., a preceding car, the bearing of the front obstacle or external object with respect to the host vehicle 10A, and the size of the front obstacle or external object.

The forward camera 140 according to the second embodiment may comprise a stereo camera or a monocular camera, insofar as the forward camera 140 is capable of acquiring the front image If, in order to detect the forward relative distance Df, the bearing of the front obstacle or external object with respect to the host vehicle 10A, and the size of the front obstacle or external object. The forward camera 140 may be either a monochromatic camera or a color camera.

The rearward camera 142 is an image capturing device, which is mounted on a front windshield or the like, not shown, of the vehicle 10A. The rearward camera 142 captures an image (rear image Ir) of a rearward area behind the vehicle 10A, and sends the captured rear image Ir to the ECU 20a. Based on the rear image Ir from the rearward camera 142, the ECU 20a detects the distance (rearward relative distance Dr) [m] to a rear obstacle or external object, e.g., a rear car, the bearing of the rear obstacle or external object with respect to the host vehicle 10A, and the size of the rear obstacle or external object. The rearward camera 142 may have specifications that are identical to or different from the specifications of the forward camera 140, insofar as the rearward camera 142 is capable of acquiring the rear image Ir in order to detect the rearward relative distance Dr, the bearing of the rear obstacle or external object with respect to the host vehicle 10A, and the size of the rear obstacle or external object.

(1-3. ECU 20a)

As shown in FIG. 11, the ECU 20a includes various hardware devices including the input/output unit 70, a processor 72a, and a memory 74a. According to the second embodiment, the processor 72a controls the brake mechanism 16 and the warning device 18 to perform various functions based on programs stored in the memory 74a.

Similar to the processor 72 of the ECU 20 according to the first embodiment, the various functions performed by the processor 72a include a periphery monitoring function 80, an ABS function 82, a traction control function 84, a lateral skidding prevention function 86, an avoidance action assistance function 88, and an emergency brake function 90.

The periphery monitoring function 80 includes image processing functions, not shown, for processing the front image If from the forward camera 140 and the rear image Ir from the rearward camera 142. The periphery monitoring function 80 includes the railroad crossing barrier estimating function 92.

Based on the front image If from the forward camera 140, the periphery monitoring function 80 detects the forward relative distance Df, the bearing of the front obstacle or external object with respect to the host vehicle 10A, and the size of the front obstacle or external object. Based on the rear image Ir from the rearward camera 142, the periphery monitoring function 80 also detects the rearward relative distance Dr, the bearing of the rear obstacle or external object with respect to the host vehicle 10A, and the size of the rear obstacle or external object.

The memory 74a comprises a RAM for storing digital image signals and temporary data, which are used in various processing sequences, and a ROM for storing executable programs as well as tables or maps.

2. Railroad-Crossing-Barrier-Related Control Process

A railroad-crossing-barrier-related control process according to the second embodiment will be described below.

(2-1. Differences from the First Embodiment)

The railroad-crossing-barrier-related control process according to the second embodiment is basically the same as the railroad-crossing-barrier-related control process according to the first embodiment. However, according to the first embodiment, the railroad-crossing-barrier-related control process is performed based on output signals from the forward radar 30 and the rearward radar 32, whereas according to the second embodiment, the railroad-crossing-barrier-related control process is performed based on output signals from the forward camera 140 and the rearward camera 142.

(2-2. General Flow of Railroad-Crossing-Barrier-Related Control Process According to the Second Embodiment)

Figure 12:
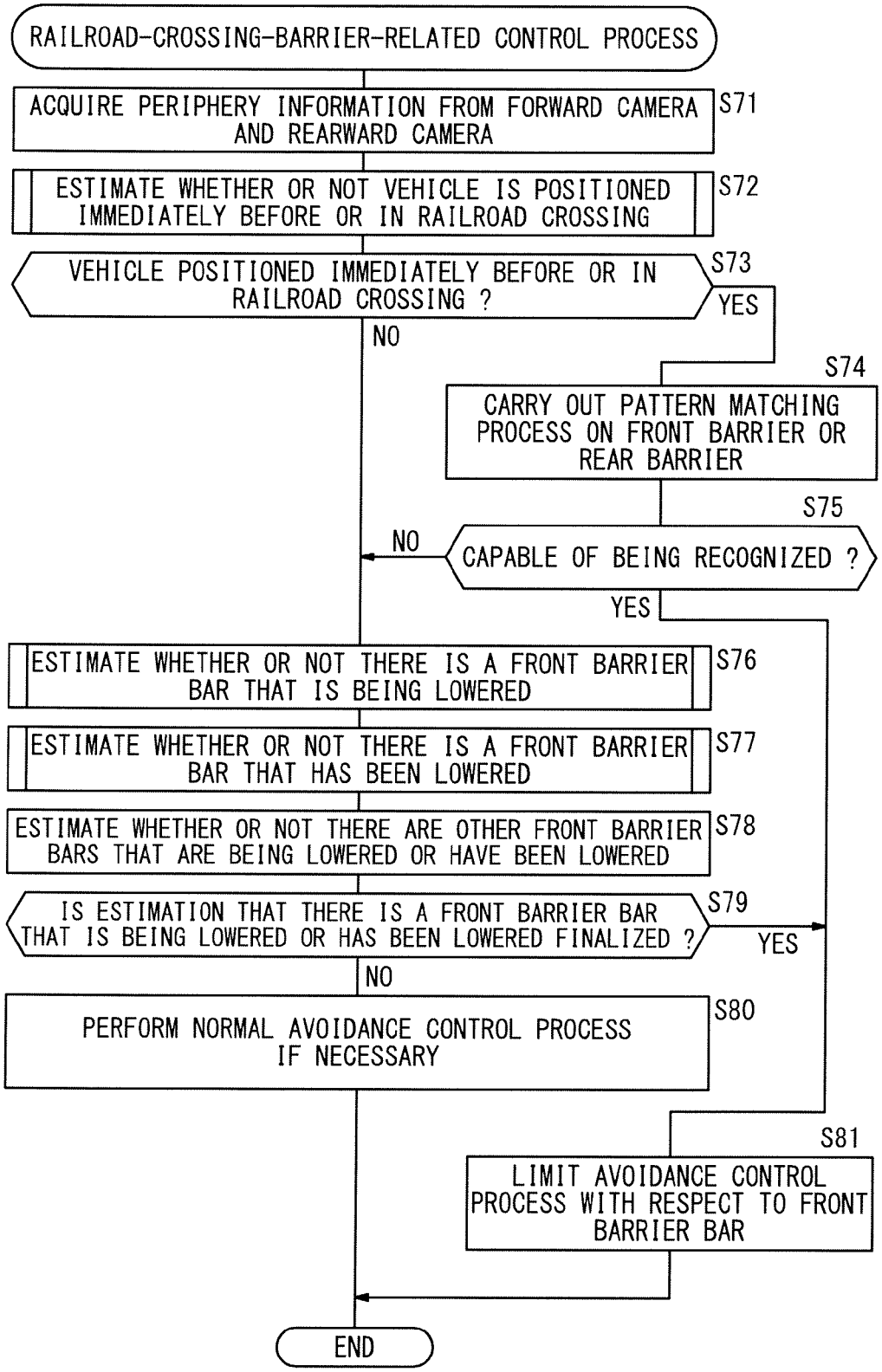
FIG. 12 is a flowchart of a general sequence of a railroad-crossing-barrier-related control process according to the second embodiment of the present invention.

FIG. 12 is a flowchart of a general sequence for a railroad-crossing-barrier-related control process according to the second embodiment of the present invention. In step S71 of FIG. 12, the ECU 20a (periphery monitoring function 80) acquires information (periphery information) concerning the periphery of the vehicle 10A from the forward camera 140 and the rearward camera 142. As described above, the forward camera 140 acquires a front image If of a forward area in front of the vehicle 10A, whereas the rearward camera 142 acquires a rear image Ir of a rearward area behind the vehicle 10A. Based on the front image If and the rear image Ir, the ECU 20a (periphery monitoring function 80) calculates three-dimensional information in relation to the forward area in front of the vehicle 10A and the rearward area behind the vehicle 10A.

In step S72, the ECU 20a (periphery monitoring function 80) estimates whether or not the vehicle 10A is positioned immediately in front of a railroad crossing 100, i.e., whether the vehicle 10A is positioned in the first area 130, and whether or not the vehicle 10A is positioned within the railroad crossing 100, i.e., whether the vehicle 10A is positioned within the second area 132.

The estimating process in step S72 is the same as the estimating process in step S2 of FIG. 4, and details thereof are the same as the details shown in the flowchart of FIG. 5. However, in step S14 shown in FIG. 5, the ECU 20a (railroad crossing barrier estimating function 92) judges whether or not there is an external object, which serves as a candidate for a front barrier 110 front, based on an output signal (front image If) from the forward camera 140, instead of an output signal from the forward radar 30.

In step S73, the ECU 20a (railroad crossing barrier estimating function 92) judges whether or not the vehicle 10A is positioned immediately in front of the railroad crossing 100, i.e., whether the vehicle 10A is positioned in the first area 130, and whether or not the vehicle 10A is positioned within the railroad crossing 100, i.e., whether the vehicle 10A is positioned within the second area 132.

If the vehicle 10A is positioned immediately in front of the railroad crossing 100, i.e., if the vehicle 10A is positioned in the first area 130, or if the vehicle 10A is positioned within the railroad crossing 100, i.e., if the vehicle 10A is positioned within the second area 132 (S73: YES), then in step S74, the ECU 20a (railroad crossing barrier estimating function 92) performs a pattern matching process on the front barrier 110 front or the rear barrier 110 rear.

More specifically, if the vehicle 10A is positioned immediately in front of the railroad crossing 100, i.e., if the vehicle 10A is positioned in the first area 130, then the ECU 20a (railroad crossing barrier estimating function 92) performs a pattern matching process in order to search for the front barrier 110 front in the front image If from the forward camera 140. If the vehicle 10A is positioned within the railroad crossing 100, i.e., if the vehicle 10A is positioned within the second area 132, then the ECU 20a (railroad crossing barrier estimating function 92) performs a pattern matching process in order to search for the front barrier 110 front in the front image If from the forward camera 140, as well as to search for the rear barrier 110 rear in the rear image Ir from the rearward camera 142.

If the ECU 20a (railroad crossing barrier estimating function 92) recognizes the front barrier 110 front or the rear barrier 110 rear as a result of the pattern matching process carried out in step S74 (S75: YES), then control proceeds to step S81.

If the vehicle 10A is not positioned immediately in front of the railroad crossing 100, i.e., if the vehicle 10A is not positioned in the first area 130, and if the vehicle 10A is not positioned within the railroad crossing 100, i.e., if the vehicle 10A is not positioned within the second area 132 (S73: NO), or if the ECU 20a (railroad crossing barrier estimating function 92) does not recognize the front barrier 110 front and the rear barrier 110 rear as a result of the pattern matching process carried out in step S74 (S75: NO), then control proceeds to step S76.

Steps S76 through S81 are basically the same as steps S3 through S8 of FIG. 4. However, steps S3 through S8 are performed based on output signals from the forward radar 30 and the rearward radar 32, whereas according to the second embodiment, steps S76 through S81 are performed based on output signals from the forward camera 140 and the rearward camera 142.

More specifically, step S76 (estimating whether or not a front barrier bar 120 front exists that is being lowered) is the same as step S3 of FIG. 4. Details of step S76 are the same as those of the flowchart shown in FIG. 6. However, the ECU 20a (railroad crossing barrier estimating function 92) judges whether or not a candidate exists for the front barrier 110 front (step S31 in FIG. 6), judges whether or not the transverse width W of the front barrier 110 front is increasing (step S32), judges whether or not the height H of the front barrier 110 front is decreasing (step S33), and judges whether or not the center P of gravity of the front barrier 110 front is moving toward the oncoming lane 106b (step S34), based on output signals (front image If) from the forward camera 140, instead of output signals from the forward radar 30.

Step S77 (estimating whether or not there is a front barrier bar 120 front that has been lowered) is the same as step S4 of FIG. 4. Details of step S77 are the same as those of the flowchart shown in FIG. 8. However, the ECU 20a (railroad crossing barrier estimating function 92) also judges whether or not the transverse width W of the front barrier 110 front exceeds the fourth threshold value TH4 (step S41 in FIG. 8), judges whether or not a portion of the candidate for the front barrier 110 front is positioned over the traveling lane 106a (step S42), judges whether or not the height H of the front barrier 110 front is greater than the fifth threshold value TH5 and smaller than the sixth threshold value TH6 (step S43), and judges whether or not the candidate for the front barrier 110 front (external object) has moved to-and-fro or in a lateral direction (step S44), based on an output signal (front image If) from the forward camera 140, instead of the output signal from the forward radar 30.

Step S78 (estimating whether or not there is another barrier bar 120, which is being lowered or has been lowered) is the same as step S5 of FIG. 4. Details of step S78 are the same as those of the flowchart shown in FIG. 9. However, the ECU 20a (railroad crossing barrier estimating function 92) judges whether or not there is a candidate for the rear barrier bar 120 rear, which is being lowered or has been lowered (step S52 in FIG. 9), based on the output signal (rear image Ir) from the rearward camera 142, instead of the output signal from the rearward radar 32. In addition, the ECU 20a (railroad crossing barrier estimating function 92) judges whether or not candidates exist for the barrier bars 120c, 120d, which are being lowered or have been lowered over the oncoming lane 106b, based on output signals (front image If, rear image Ir)

from the forward camera 140 and the rearward camera 142, instead of output signals from the forward radar 30 and the rearward radar 32.

Step S79 (judging whether the ECU 20*a* (railroad crossing barrier estimating function 92) has finalized the estimation that a front barrier bar 120 front exists, which is being lowered or has been lowered) is the same as step S6 of FIG. 4. Details of step S79 are the same as those of the flowchart shown in FIG. 10. In addition, steps S80 and S81 are the same as steps S7 and S8 of FIG. 4.

3. Advantages of the Second Embodiment

The second embodiment offers the following advantages, in addition to or apart from the advantages according to the first embodiment.

According to the second embodiment, when at least one of an external object the transverse width W of which increases over time (see step S32 in FIG. 6), and an external object having a given length at a certain height from the ground (see steps S41, S43 in FIG. 8) is detected, the external object is estimated as the railroad crossing barrier 110. Therefore, even if the image capturing performance (resolution, number of pixels, image capturing range, etc.) of the forward camera 140 is relatively low, it is still possible for an external object to be estimated as the railroad crossing barrier 110.

C. Modifications

The present invention is not limited to the above embodiments, but various arrangements may be adopted based on the present disclosure. For example, the present invention may adopt the following arrangements.
1. Railroad Crossing Barriers 110

In each of the above embodiments, the barriers 110 estimated by the vehicle 10 have been described as barriers for use at a railroad crossing 100. However, the barriers 110 are not limited to barriers for railroad crossings 100, but may be any type of barrier that limits mobile bodies against movement using barrier bars 120. For example, the present invention is applicable to barriers at toll booths, parking lots, expressways, etc., for example.
[2. Target Applications]

In each of the above embodiments, the vehicle 10 estimates the presence of railroad crossing barriers 110. However, mobile bodies other than the vehicle 10 may be used to estimate the presence of railroad crossing barriers 110.

In each of the above embodiments, the barriers 110 are estimated in order to perform an avoidance control process (to assist the driver in turning the steering wheel 60, automatically braking the vehicle 10, or outputting a warning sound, etc.) with respect to the vehicle 10. However, the barriers 110 may be estimated in order to perform other applications. For example, the barriers 110 may be estimated in order to inform the driver of the presence of a railroad crossing 100. The avoidance control process may also include a control process for displaying a warning on a head-up display, rather than control processes to assist the driver in turning the steering wheel 60, automatically braking the vehicle 10, or outputting a warning sound, etc.
[3. Forward Radar 30, Rearward Radar 32, Forward Camera 140, and Rearward Camera 142]

In the first embodiment, the forward radar 30 is used to detect the front barrier 110 front. In the second embodiment, the forward camera 140 is used to detect the front barrier 110 front. However, any of various other sensors may be used to detect the front barrier 110 front. Alternatively, for example as disclosed in JP11-044533A, both the forward radar 30 and the forward camera 140 may be used to detect the front barrier 110 front. In this case, at least one of the output signals from the forward radar 30 and the forward camera 140 may be used in the various control processes. The same features may also be applied to the rearward radar 32 and the rearward camera 142.

According to the first embodiment, the forward radar 30 transversely scans a forward area in front of the vehicle 10 successively in a vertical direction (see FIG. 2). However, the forward radar 30 may scan the forward area in other ways in order to detect the barrier bars 120. For example, in order to estimate the presence of barrier bars 120 that have been lowered, the forward radar 30 may transversely scan the forward area at least at a height at which the barrier bars 120 are kept still. Alternatively, in order to estimate the presence of barrier bars 120 that are being lowered, the forward radar 30 preferably scans the forward area at least two-dimensionally, i.e., in transverse and heightwise directions of the vehicle 10.

According to the second embodiment, it is assumed that the forward camera 140 is capable of capturing an entire image of the front barrier 110 front as well as the front barrier 110*c* over the oncoming lane 106*b*. However, similar to the forward radar 30, the forward camera 140 may scan the forward area in other ways in order to detect the barrier bars 120. For example, for estimating the presence of barrier bars 120 that have been lowered, the forward camera 140 may capture an image of the forward area at least at a height at which the barrier bars 120 are kept still. Alternatively, in order to estimate the presence of barrier bars 120 that are being lowered, the forward camera 140 may capture an image of the forward area at least two-dimensionally, i.e., in transverse and heightwise directions of the vehicle 10. The same features may be applied to the rearward camera 142 as well.

In the first embodiment, the rearward radar 32 is used to detect the rear barrier 110 rear. In the second embodiment, the rearward camera 142 is used to detect the rear barrier 110 rear. However, the rearward radar 32 and the rearward camera 142 need not necessarily be used, i.e., the rear barrier 110 rear may not necessarily be detected.
[4. Navigation System 14]

In each of the above embodiments, the position of the railroad crossing 100 is estimated using map information from the navigation system 14. However, map information from the navigation system 14 need not necessarily be used for detecting the barrier bars 120. Alternatively, the position of the railroad crossing 100 may be estimated based on map information (route information) from light beacons, not shown, which are installed alongside the vehicle road 102, rather than based on map information from the navigation system 14. Further, alternatively, the position of the railroad crossing 100 may be estimated based on map information that is acquired from an external source, e.g., an external server, a peripheral vehicle 112, or the like, through a communication unit (not shown) installed in the vehicle 10, 10A.
[5. Railroad Crossing 100]

In each of the above embodiments, the railroad crossing 100 comprises the four railroad crossing barriers 110*a*, 110*b*, 110*c*, 100*d* (see FIG. 3). However, the railroad crossing 100 is not limited to such a structure, insofar as the barrier bars 120 thereof can be detected. Only one railroad crossing barrier 110 may be installed on each side of the rail tracks 104*a*, 104*b*. For example, only the railroad crossing barriers 110*a*, 110*c* may be installed, whereas the other railroad crossing barriers 110*b*, 110*d* may be dispensed with. In this case, when lowered, each of the barrier bars 120 serves to block two lanes, i.e., the traveling lane 106a and the oncoming lane 106b.

In each of the above embodiments, the barrier bars 120 are straight (see FIG. 7). However, the present invention may also be applied to bent barrier bars.

In each of the above embodiments, the front barrier 110 front is identified using the position of the barrier actuator 122, the range of the transverse width W, and the range of the height H. However, the presence of the front barrier 110 front may be determined in other ways. For example, the front barrier 110 front may be identified by determining that a bar-shaped object having a given length is supported in a cantilevered fashion.

In each of the above embodiments, it is estimated whether or not there is a front barrier bar 120 front, which is currently being lowered, using morphological features (length, width, etc.) of the front barrier 110 front (see FIG. 6). However, whether or not a front barrier bar 120 front exists that is currently being lowered may also be estimated using morphological features (length, width, etc.) of the front barrier bar 120 front.

According to the first embodiment, the vehicle-in-crossing estimating flag FLG1 is set using the decisions made in steps S11 through S16 of FIG. 5. However, the vehicle-in-crossing estimating flag FLG1 may be set with certain ones of such steps being dispensed with, or with other steps being added. The same feature is true for the other flags FLG2 through FLG7, as well as for the flags used in the second embodiment.

According to the second embodiment, if the front barrier 110 front or the rear barrier 110 rear is recognized according to a pattern matching process (step S74 in FIG. 12) (S75: YES), then the avoidance control process is limited with respect to the front barrier bar 120 front (step S81). However, insofar as the presence of a signal barrier is estimated using at least one of the front image If from the forward camera 140 or the rear image Ir from the rearward camera 142, the pattern matching process need not necessarily be carried out. Stated otherwise, steps S73 through S75 shown in FIG. 12 may be dispensed with.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A vehicle comprising:
an avoidance controller configured to perform an avoidance control process for avoiding a collision between the vehicle and an external object by automatically steering the vehicle around the external object, if the external object is present on a route of the vehicle, or if the external object is about to enter the route;
the avoidance controller comprising:
an external object position judger configured to judge over a period of time a three-dimensional relative position and relative apparent shape of the external object with respect to a position of the vehicle; and
a railroad crossing barrier estimator configured to estimate the presence of a railroad crossing barrier by estimating that the external object is the railroad crossing barrier when the transverse width of the relative apparent shape of the external object increases and the height of the relative apparent shape of the external object decreases over the period of time;
wherein, if the external object is estimated as the railroad crossing barrier, the avoidance controller cancels or changes the avoidance control process with respect to the railroad crossing barrier to prevent the vehicle from automatically steering around the railroad crossing barrier.

2. The vehicle according to claim 1, wherein the vehicle is detected as being positioned in or before a railroad crossing based on a behavior exhibited by the vehicle when the vehicle moves through the railroad crossing, or based on map information; and
the avoidance control process is changed if the vehicle is positioned in or before the railroad crossing, and a barrier bar of the railroad crossing barrier is being lowered.

3. A railroad crossing barrier estimating apparatus, which is adapted to be installed on a mobile body, for detecting external objects using a radar for scanning at least two layers having different heights from the ground over a period of time, or using an image capturing device for capturing a plurality of images over the period of time of an area including the at least two layers, and estimating a railroad crossing barrier from among the external objects,
wherein, a particular external object of the external objects is estimated to be the railroad crossing barrier if from the perspective of the apparatus the relative apparent transverse width of the particular external object increases and the relative apparent height of the particular external object decreases over the period of time.

4. A computer processor implemented method for controlling a vehicle, comprising:
performing, by the processor, an avoidance control process for avoiding a collision between the vehicle and an external object by automatically steering the vehicle around the external object, if the external object is present on a route of the vehicle, or if the external object is about to enter the route;
scanning using a radar at least two layers having different heights from the ground over a period of time, or capturing using an image capturing device a plurality of images over the period of time of an area including the at least two layers;
judging, by the processor, based on an output of the radar or the plurality of images over the period of time a three-dimensional relative position and relative apparent shape of the external object with respect to a position of the vehicle; and
estimating, by the processor, the presence of a railroad crossing barrier by estimating that the external object is the railroad crossing barrier when the transverse width of the relative apparent shape of the external object increases and the height of the relative apparent shape of the external object decreases over the period of time;
cancelling, by the processor, the avoidance control process with respect to the railroad crossing barrier to prevent the vehicle from automatically steering around the railroad crossing barrier when the external object is estimated to be the railroad crossing barrier.

* * * * *